United States Patent
Lam et al.

(10) Patent No.: US 11,157,000 B2
(45) Date of Patent: Oct. 26, 2021

(54) CENTRAL CONTROL SYSTEM AND METHOD

(71) Applicant: Farfetch UK Limited, London (GB)

(72) Inventors: Meilene Lam, London (GB); Paolo Zoccante, London (GB); Abie Cohen, London (GB)

(73) Assignee: FARFETCH UK LIMITED, London (GB)

( * ) Notice: Subject to any disclaimer, the term of this patent is extended or adjusted under 35 U.S.C. 154(b) by 261 days.

(21) Appl. No.: 16/229,952

(22) Filed: Dec. 21, 2018

(65) Prior Publication Data

US 2019/0219999 A1 Jul. 18, 2019

(30) Foreign Application Priority Data

Dec. 22, 2017 (EP) .................................. 17275199
Dec. 22, 2017 (GB) .................................. 1721827

(51) Int. Cl.

| | |
|---|---|
| G05D 1/00 | (2006.01) |
| H04W 4/40 | (2018.01) |
| G06Q 50/30 | (2012.01) |
| H04W 84/00 | (2009.01) |
| B60W 30/00 | (2006.01) |
| G01C 21/34 | (2006.01) |
| B60W 50/00 | (2006.01) |

(52) U.S. Cl.
CPC ........... G05D 1/0022 (2013.01); B60W 30/00 (2013.01); G01C 21/34 (2013.01); G06Q 50/30 (2013.01); H04W 4/40 (2018.02); H04W 84/00 (2013.01); *B60W 2050/0079* (2013.01)

(58) Field of Classification Search
CPC ...... G05D 1/0022; H04W 4/40; H04W 84/00; G06Q 50/30; B60W 30/00; B60W 20/00; B60W 2050/0079; G01C 21/34
See application file for complete search history.

(56) References Cited

U.S. PATENT DOCUMENTS

| | | | |
|---|---|---|---|
| 6,665,606 B2 * | 12/2003 | Mathew | .............. F02D 41/2487 |
| | | | 701/114 |
| 2007/0233349 A1* | 10/2007 | Segal | .................... F02D 41/021 |
| | | | 701/57 |
| 2009/0240388 A1 | 9/2009 | Harris | |

(Continued)

OTHER PUBLICATIONS

PCT International Search Report and Written Opinion, PCT Application No. PCT/GB2018/053764, dated Feb. 22, 2019, 16 pages.

(Continued)

*Primary Examiner* — Marthe Y Marc-Coleman
(74) *Attorney, Agent, or Firm* — Fenwick & West LLP

(57) ABSTRACT

A computer-implemented control system for generating control signals for controlling one or more remotely-located interaction units via a wide-area communications network is described. The control system comprises: a request interface processor for receiving a request for a control signal of a requested control parameter (RCP) relating to a specified environmental requirement (SER) from one of the one or more remotely-located interaction units; the request including: a current value of the RCP, a specified value of the SER; and current values of one or more local environmental parameters (local CERs) related to the SER.

20 Claims, 18 Drawing Sheets

(56) References Cited

U.S. PATENT DOCUMENTS

| | | |
|---|---|---|
| 2014/0046528 A1 | 2/2014 | Santucci et al. |
| 2015/0205298 A1 | 7/2015 | Stoschek et al. |
| 2016/0334229 A1 | 11/2016 | Ross et al. |
| 2018/0017962 A1 | 1/2018 | Miller et al. |

OTHER PUBLICATIONS

European Patent Office, Extended European Search Report and Opinion, EP Patent Application No. 17275199.2, dated Jun. 8, 2018, ten pages.

The Intellectual Property Office of the United Kingdom, Search Report under Section 17, GB Patent Application No. 1721827.2, dated Jun. 18, 2018, five pages.

\* cited by examiner

External CER classification

| | | Bad | OK | Good |
|---|---|---|---|---|
| Local CER classification at current speed | ≥ 15% under target distance | Reduce speed by 20% | Reduce speed by 10% | Reduce speed by 5% |
| | < 15% and > 5% under target distance | Reduce speed by 10% | Reduce speed by 5% | Do not alter speed |
| | Within 5% of target distance | Reduce speed by 5% | Do not alter speed | Do not alter speed |
| | < 15% and > 5% over target distance | Increase speed by 10% | Increase speed by 5% | Do not alter speed |
| | ≥ 15% over target distance | Increase speed by 20% | Increase speed by 10% | Increase speed by 5% |

Figure 10

CENTRAL CONTROL SYSTEM AND METHOD

CROSS REFERENCE TO RELATED APPLICATIONS

This application claims priority to Great Britain application GB 1721827.2, filed Dec. 22, 2017 and European application EP 17275199.2, filed Dec. 22, 2017, the contents of each being incorporated by reference herein.

FIELD OF ART

The present invention concerns a central control system and method. More particularly, though not exclusively, the present invention concerns a processing architecture arranged to receive requests from remote (remotely-located) interaction units and subsequently provide them with control signals to enable the remote interaction units to operate in the most efficient manner in accordance with environmental requirements. One non-limiting area of application is to fuel management in autonomous electric vehicles.

BACKGROUND

A wide variety of systems operate in real-time environments in which the correct and efficient operation of the system is dependent upon the constantly changing parameters of the environment preferences of a user of the system. As a result, a system operating in these environments will often need to alter the way in which it operates and this decision is usually reliant on the persistent monitoring of these environmental conditions and user preferences. In some scenarios, an incorrect or inefficient action may in fact prove to be highly detrimental or even terminal to the operation of the system.

One non-limiting example of such a system is seen in the management of fuel levels in automotive vehicles, where improper management may lead to the vehicle running out of fuel in a location where fuel is unavailable. This is a particularly important consideration for electric vehicles, as recharge stations are comparatively uncommon and non-linear charge consumption is often a key factor when planning a journey. Charging an electric vehicle is also time-consuming and a user may have specific requirements relating to how long they wish to be in a charging station for and mismanagement of the remaining level of charge may lead to the vehicle needing to be charged for longer than the user desires.

Typically, the operation of a distributed system in a real-time environment often has required varying degrees of user input and where the operation at some location has not been optimal, a user is required to make changes within the system in order to correct this. However, there are several issues which arise as a result of this solution. When a user makes a local change to the system, they may be unaware of all relevant information from the overall system which may affect their decision. For example, returning to the electric vehicle example described above, if a driver of a vehicle wishes to reduce fuel consumption, they may alter their route to their destination so that they take a slower but shorter route. However, there may be an obstruction on this new route of which they are unaware, and this obstruction may cause their vehicle to consume more fuel (resource) than their previous route, meaning that the change which is made is in fact a suboptimal one due to their lack of information. This method also introduces the possibility of simple human error, regardless of their awareness of all information.

There is an increasing focus towards automation of systems in a majority of fields. The automotive field, for example, has seen a number of developments relating to the use of autonomous vehicles in which control systems within the vehicle are able to control various aspects of the vehicle, such as vehicle velocity and braking (in combination with vehicle cruise control), and automatic pathfinding. However, in terms of appropriate and efficient action, these automated systems still are dependent on user interaction. In the above vehicle example, this manifests as a user needing to monitor their remaining fuel levels and instructing their vehicle to alter their heading in order that they can refuel.

The present invention has been devised against this backdrop and seeks to obviate at least some of the above-described problems with existing systems dependent on real-time environment monitoring. More particularly, the present invention aims to provide a real-time processing architecture which is able to provide (within a distributed system) a remote interaction unit which operates in a real-time environment with instructions so that resource is consumed efficiently and in accordance with the preferences of a user of the remote interaction unit.

SUMMARY

According to one aspect of the present invention there is provided a computer-implemented control system for generating control signals for controlling one or more remotely-located interaction units via a wide-area communications network, the control system comprising: a request interface processor for receiving a request for a control signal of a requested control parameter (RCP) relating to a specified environmental requirement (SER) from one of the one or more remotely-located interaction units; the request including: a current value of the RCP, a specified value of the SER; and current values of one or more local environmental parameters (local CERs) related to the SER; wherein a current value of the SER can be calculated from the current values of the RCP and the one or more local CERs of the one or more remotely-located interaction units; a parameter calculation system for processing the request received at the request interface processor in accordance with predefined rules and to generate the control signal concerning the RCP; and a transmitter for transmitting the generated control signal to a requesting remotely-located interaction unit, wherein the parameter calculation system comprises: a classification engine for classifying a plurality of current external environmental parameters (external CERs) associated with the remotely-located interaction unit into a single external CER parameter; and a parameter calculation processor arranged to: calculate the current value of the SER by applying the rules to the current value of the RCP and the current values of the one or more local CERs of the one or more remotely-located interaction units; categorise the current value of the SER with the value of the single external CER parameter to determine the effect of the plurality of current external CERs on the current value of the SER; compare the categorised current value of the SER with the specified value of the SER and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

Embodiments of the present invention thus provide a control system which can consider a multitude of different variables local and external and provide to a remotely-located interaction unit a control signal based on a value of a selected control parameter to control the interaction unit to meet is environmental constraints and, in particular, a specified environmental constraint (SER). This simplification of control is highly advantageous in control systems where there are often hundreds or thousands of constraints to be considered and taken into account but where control needs to be easy to implement and thus limited to a single control parameter to achieve a specified constraint. Because the system considers many different local and external environmental constraints, the control signal is more accurate than has been possible with prior art systems. It is responsive to changes in these constraints and completely scalable to handle many thousands of remotely-located interaction units.

In some embodiments of the present invention described herein the parameter calculation system further comprises an information collection processor arranged to request and obtain the values of any external CERs for use by the parameter calculation processor in calculating the current value of the SER. The information collection processor can be arranged to determine at least some of the required external CERs from the one or more parameters specified in the request.

In some embodiments described herein the request comprises a local CER including a location of the remotely-located interaction unit; and the information collection processor is arranged to use the location of the remotely-located interaction unit to determine which external CERs are to be used for generation of the classified single external CER parameter. Providing constraints based on location is highly advantageous when environmental conditions are being considered as these can vary substantially from location to location.

In one embodiment, the information collection processor is arranged to collect information pertaining to the request from internal databases and external data sources and calculate parameter values from the received information or aggregate the received information for further processing.

In some embodiments of the present invention, the parameter calculation system further comprises a results processor which is arranged to receive the control signal from the parameter calculation processor and store the local and external CERs, the result of the categorisation and classification, and the control signal to a parameter results store for provision to the remote interaction unit and for use as historical parameter data. In these embodiments, the request interface processor is arranged to receive a request which includes: one or more historical information parameters, and the information collection processor is arranged to retrieve values for the historical information parameters from the historical parameter data stored in the local data store. The creation and subsequent use of historical parameter data can be highly advantageous. For example if the current request for a control signal is very similar to or identical to a historical request, then the parameter calculation processing can be avoided and the control signal can be generated directly from the this historical data.

In some embodiments, wherein the classification engine comprises a classification generating matrix arranged to combine together a plurality of different external CERs in different combinations to arrive at a single overall external CER classification describing the external CERs.

The classification engine is, in some embodiments, arranged to classify the plurality of external CERs in a plurality of scenarios with qualitative descriptions, each qualitative description having assigned thereto a particular score which can be used to manipulate the qualitative description as a quantitative classification.

In some embodiments, the parameter calculation processor comprises an instruction generating matrix arranged to provide the corresponding predetermined action as one of a plurality of predetermined instructions provided in the matrix, the matrix being indexed by: the current SER value based on the current values of the one or more local environmental parameters (local CERs) at the current value of the RCP; and the single external overall CER classification. Whilst there are many different ways of determining a single overall external CER classification or a predetermined action to take considering a multitude of restrictions and classifications, the use of a matrix presents a simple and easy way to implement this technique.

In some embodiments of the present invention, the system further comprises a notification system for notifying the status of the received request, the notification system being arranged to at least send a notification to the requesting remote interaction unit, when the request has been processed and the control signal is ready to be transmitted on-demand to the requesting remote interaction unit and wherein the transmitter is arranged to transmit the control signal to the requesting remote interaction unit on receipt of a pull instruction from the requesting remote interaction unit.

In some embodiments, a request queue is provided for storing the request until the parameter calculation system is able to process the request to generate the control signal, wherein the notification system is coupled to the request queue and the notification system is arranged to determine a real-time record of the status of the request indicating whether the request is waiting to be processed, is being processed or has been processed and to provide a status of the request to the requesting remote interaction unit on demand.

The request interface processor may be arranged, in some embodiments, to assign a unique identifier to each received request, and the notification system is arranged to use the identifier to determine the real-time status of the request. This enables tracking of the request throughout the system.

The request interface processor, in some embodiments, is arranged to verify the veracity and integrity of the request and to notify the requesting remote interaction unit if a request cannot be processed. Such checking is important where the request can get corrupted in transmission and so may need to be sent again.

In some embodiments, the request interface processor is arranged to receive a proxy request relating to one or more different remotely-located interaction units; and the parameter calculation system is arranged to generate a control signal for controlling the one or more different remotely-located interaction units rather than the requesting remotely-located interaction unit. This enables one remotely-located interaction unit to act as point of communication with the system and enables simplification of interaction units as not all of them have to be able to communicate directly with the system, but can do so indirectly via another remotely located interaction unit.

The specified value of the SER can, in some embodiments, be a predetermined value stored in the control system and the received request can comprise a trigger identifier indicating to the parameter calculation processor that the predetermined stored value of the SER should be used as the specified SER in its comparison.

In some embodiments of the present invention, the request interface processor is arranged to receive a request relating to a plurality of remotely-located interaction units; to divide the request into a plurality of sub-requests each relating to a subset of the one or more remotely-located interaction units and the parameter calculation system is arranged to process each of the plurality of sub-requests and generate a control signal for each of the sub-requests for controlling the respective one of the remotely-located interaction units. This can provide a great increase in the transmission efficiency and can enable overcoming of intermittent request receipt problems when communications are blocked (in the vehicle example when the vehicle is for example in a tunnel).

According to another aspect of the present invention there is provided a computer-implemented method for generating control signals for controlling one or more remotely-located interaction units via a wide-area communications network, the method comprising: receiving a request for a control signal of a requested control parameter (RCP) relating to a specified environmental requirement (SER) from one of a plurality of remotely-located interaction units; the request including: a current value of the RCP, a specified value of the SER; and current values of one or more local environmental parameters (local CERs) related to the SER; wherein a current value of the SER can be calculated from the current values of the RCP and the one or more local CERs; processing the request received at the request interface processor in accordance with predefined rules and to generate the control signal concerning the RCP; and transmitting the generated control signal to a requesting remotely-located interaction unit, wherein the processing step comprises: classifying a plurality of current external environmental parameters (external CERs) associated with the remotely-located interaction unit into a single external CER parameter; calculating the current value of the SER by applying the rules to the current value of the RCP and the current values of the one or more local CERs; categorising the current value of the SER with the value of the single external CER parameter to determine the effect of the plurality of current external CERs on the current value of the SER; comparing the categorised current value of the SER with the specified value of the SER and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

In another embodiment there is provided a non-transitory computer-readable medium having instructions comprising a software program stored thereon, wherein the instructions are configured to be executed on a processor of a computer-implemented control system, and the instructions, upon execution by the processor, enable the computer-implemented control system to generate control signals for controlling one or more remotely-located interaction units via a wide-area communications network, the instructions causing the computer-implemented control system to: receive a request for a control signal of a requested control parameter (RCP) relating to a specified environmental requirement (SER) from one of a plurality of remotely-located interaction units; the request including: a current value of the RCP, a specified value of the SER; and current values of one or more local environmental parameters (local CERs) related to the SER; wherein a current value of the SER can be calculated from the current values of the RCP and the one or more local CERs; process the request received at the request interface processor in accordance with predefined rules and to generate the control signal concerning the requested control parameter (RCP); and transmit the generated control signal to a requesting remotely-located interaction unit, wherein the process step comprises: classifying a plurality of current external environmental parameters (external CERs) associated with the remotely-located interaction unit into a single external CER parameter; calculating the current value of the SER by applying the rules to the current value of the RCP and the current values of the one or more local CERs; categorising the current value of the SER with the value of the single external CER parameter to determine the effect of the plurality of current external CERs on the current value of the SER; comparing the categorised current value of the SER with the specified value of the (SER) and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

The above described features of the embodiments are combinable in different ways and can be added to the following specific description of the embodiments of the present invention if not specifically described therein.

BRIEF DESCRIPTION OF THE DRAWINGS

In order that the invention may be more readily understood, reference will now be made, by way of example, to the accompanying drawings in which:

FIG. 10 is a tabular illustration, showing an example scenario of how local and external environmental constraints may be categorised in a possible embodiment of the method of FIG. 8B.

DETAILED DESCRIPTION OF EXAMPLE EMBODIMENTS

Specific embodiments are now described with reference to the appended figures. By way of example, disclosed is a computer-implemented control system for generating control signals for controlling one or more remotely-located interaction units via a wide-area communications network. The control system comprises: a request interface processor for receiving a request for a control signal of a requested control parameter (RCP) relating to a specified environmental requirement (SER) from one of the one or more remotely-located interaction units; the request including: a current value of the RCP, a specified value of the SER; and current values of one or more local environmental parameters (local CERs) related to the SER; wherein a current value of the SER can be calculated from the current values of the RCP and the one or more local CERs of the one or more remotely-located interaction units; a parameter calculation system for processing the request received at the request interface processor in accordance with predefined rules and to generate the control signal concerning the RCP; and a transmitter for transmitting the generated control signal to a requesting remotely-located interaction unit, wherein the parameter calculation system comprises: a classification engine for classifying a plurality of current external environmental parameters (external CERs) associated with the remotely-located interaction unit into a single external CER parameter; and a parameter calculation processor arranged to: calculate the current value of the SER by applying the rules (11A) to the current value of the RCP and the current values of the one or more local CERs of the one or more remotely-located interaction units; categorise the current value of the SER with the value of the single external CER parameter to determine the effect of the plurality of current external CERs on the current value of the SER; compare the categorised current value of the SER with the specified value of the SER and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

Figure 1A:
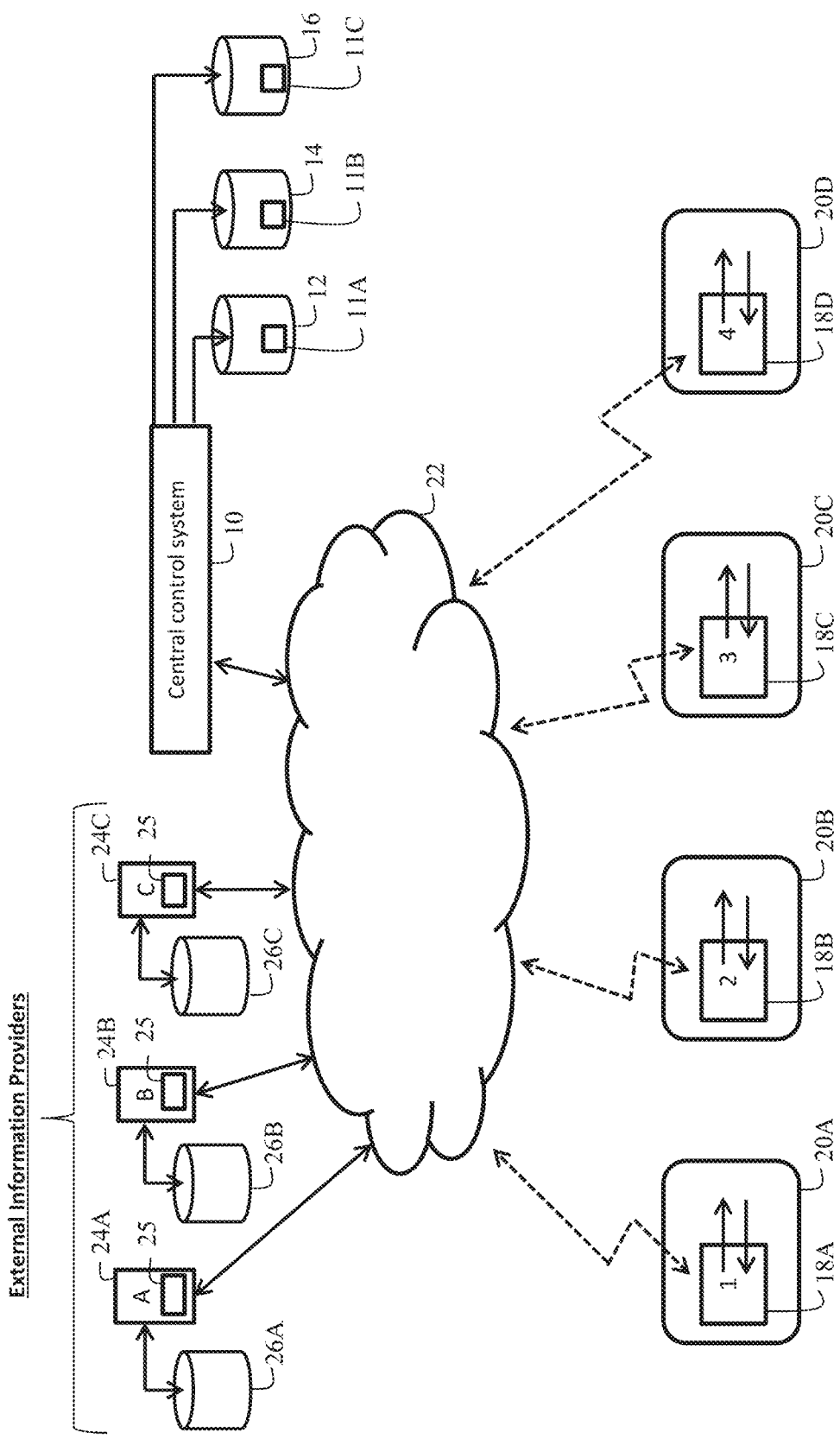
FIG. 1A is a schematic block diagram, showing a central control system in combination with a plurality of remote interaction units and their associated systems, and external information sources, illustrating a use scenario in accordance with an embodiment of the present invention.

Turning firstly to FIG. 1A, there is shown a use scenario for a central control system 10 according to a first embodiment of the present invention, which processes requests for determining an action to be taken and generating control signals to enact that action from one or more remote interaction units 18A, 18B, 18C, 18D, where the action which can be taken by the one or more remote interaction units 18A, 18B, 18C, 18D is typically constrained by one or more constraining environmental requirements (CERs), where one or more of the CERs is specified by a local electronic controller of the remote interaction unit (not shown) and is termed a specified environmental requirement (SER). The local electronic controller is configured to determine a suitable environmental constraint which can be directly controlled by the remote interaction unit enacting a particular action, and the local electronic controller will designate this environmental constraint as the SER. In an alternate embodiment, the SER may be selected by a user of the remote interaction unit 18A, 18B, 18C, 18D. The CERs, and in particular the SER, will typically be expressible in a quantitative manner, either as one specific value or as a range of values.

These CERs can be specific to a local environment 20A, 20B, 20C, 20D in which a particular remote interaction unit 18A, 18B, 18C, 18D resides, and as such only affect the relevant remote interaction unit 18A, 18B, 18C, 18D. In particular, an SER which is specified by a user of the remote interaction unit 18A, 18B, 18C, 18D is a non-limiting example of a local CER. These local CERs are typically stored in a local data store such as a hardware memory (not shown) which forms part of the relevant local environment 20A, 20B, 20C 20D, and the remote interaction unit 18A, 18B, 18C, 18D is configured to access this local data store to retrieve the local environmental requirements. The local data store may also be arranged such that it forms part of the remote interaction unit 18A, 18B, 18C, 18D.

The CERs can also be external to the local environments 20A, 20B, 20C, 20D and act to constrain the actions of a plurality of remote interaction units 18A, 18B, 18C, 18D. Such external CERs are typically unknown in advance by the one or more remote interaction units 18A, 18B, 18C, 18D and only become known once the effect of the constraint is encountered by the remote interaction unit 18A, 18B, 18C, 18D or by the central control system 10. It is to be understood that the number of remote interaction units 18A, 18B, 18C, 18D shown is for illustrative purposes only and that typically tens of thousands of remote interaction units can be working with the system at any time.

Figure 1B:
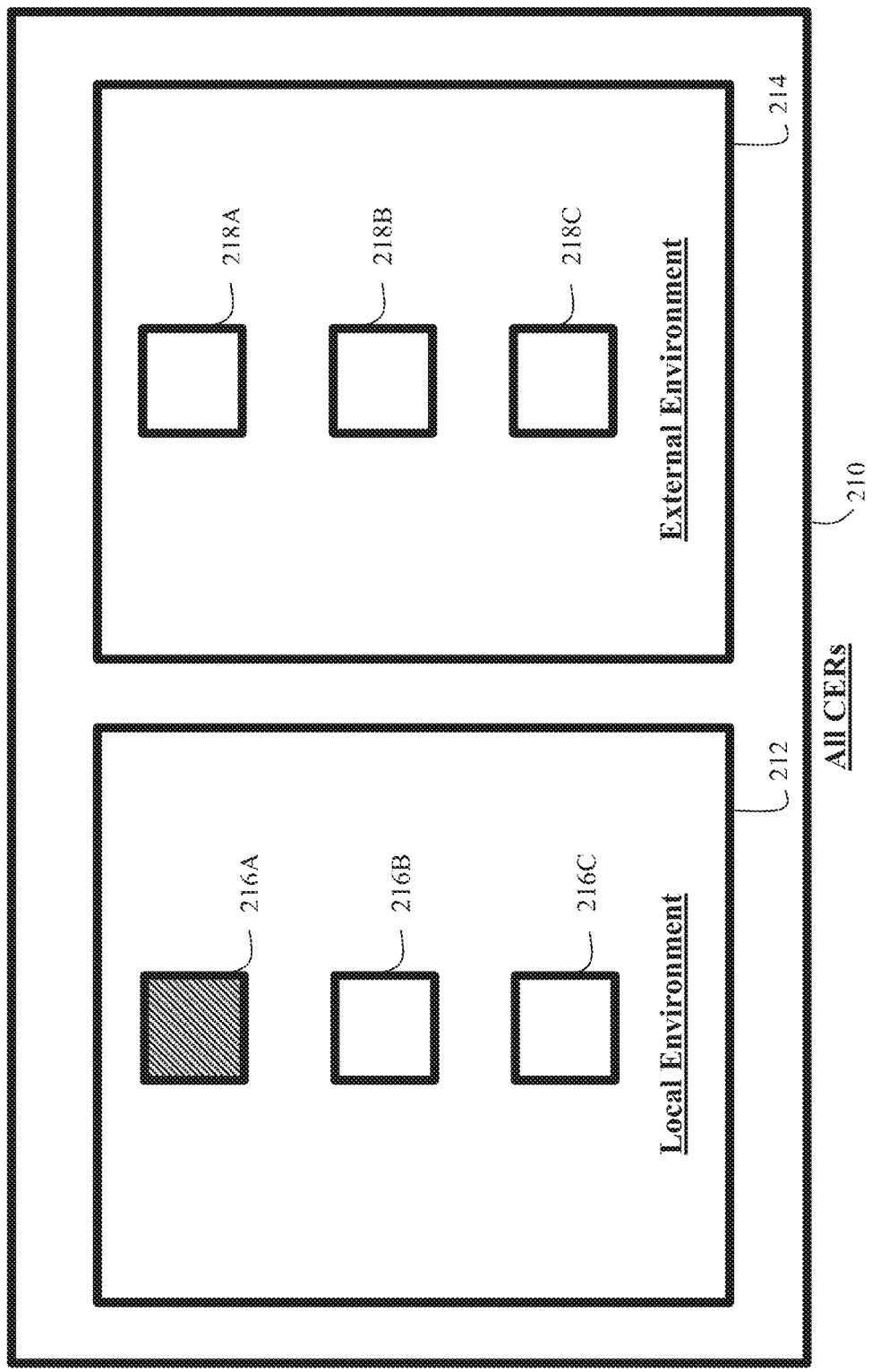
FIG. 1B is a schematic block diagram, showing an illustrative example of the relationship between various categories of environmental constraint used in the central control system and remote interaction units of FIG. 1A

FIG. 1B provides an illustrative example of the potential relationship between the various types of all constraining environmental requirements (CERs) 210 in an embodiment of the present invention. The first division separates the CERs between those which are specific to a local environment 20A, 20B, 20C, 20D which are termed local CERs 212, and those which are external to the local environments 20A, 20B, 20C, 20D, which are termed external CERs 214. The local CERs 212 comprise a plurality of individual CERs 216A, 216B, 216C which are specific to the local environment in which they reside, in accordance with the description above. In the illustrated example, there is also provided one SER 216A which is specified by the local electronic controller of the remote interaction unit 18A, 18B, 18C, 18D, or a user of the remote interaction unit 18A, 18B, 18C, 18D associated with the local environment 20A, 20B, 20C, 20D, and this SER is one of the provided local CERs. Similarly, the external CERs 214 comprise a plurality of individual CERs 218A, 218B, 218C which are external to the local environment 20A, 20B, 20C, 20D which can act to constrain the actions of a plurality of remote interaction units 18A, 18B, 18C, 18D. It is to be understood that the number of local CERs 216A, 216B, 216C and external CERs 218A, 218B, 218C shown in FIG. 1B is for illustrative purposes only.

Returning to the use scenario of FIG. 1A, the action to be taken may typically be governed by the altering of a particular command parameter utilised by the remote interaction unit 18A, 18B, 18C, 18D which when altered, leads to an action being taken. The actioning of the command will typically affect the operating conditions of at least one corresponding system in the local environment 20A, 20B, 20C, 20D in which the remote interaction unit 18A, 18B, 18C, 18D resides. The local environments 20A, 20B, 20C, 20D will typically comprise multiple systems and the remote interaction units 18A, 18B, 18C, 18D may be configured such that the action taken by the remote interaction unit 18A, 18B, 18C, 18D only affects the operating conditions of a subset of these systems.

The remote interaction units 18A, 18B, 18C, 18D are typically configured to transmit their requests to the central control system 10 via an external communications network 22. The central control system 10 may then be configured to access one or more local databases 12, 14, 16 to enable the central control system to effectively process the received request and also to store the results of the request where required. In some of the embodiments, the databases 12, 14, 16 are located in a different physical location than the central control system 10 and are coupled thereto through a communication network (e.g. in the case of a cloud storage solution). In addition, in some other embodiments the central control system 10 may be configured to retrieve data from Application Programming Interfaces (APIs), local files, caching systems, or messaging systems; similarly, the results of the requests can be sent to APIs, local files, caching systems, or messaging systems. The information stored in the local databases 12, 14, 16 includes a set of prescribed rules 11A, 11B, 11C which are able to instruct the central control system 10 how to process a received request. The information stored in the local databases 12, 14, 16 may additionally include qualitative and quantitative information (not shown) relating to the remote interaction units 18A, 18B, 18C, 18D and their associated environments 20A, 20B, 20C, 20D which is required by the central control system 10 to process the received request. The information stored in the local databases 12, 14, 16 may also include historical information (not shown) relating to previous requests which have been made by a remote interaction unit 18A, 18B, 18C, 18D which may be used in the processing of a current request. The central control system 10 may also be configured to store the results of a processed request in the one or more databases 12, 14, 16. The information described above may be stored in a single hardware database or stored in a plurality of hardware databases. The one or more databases may alternatively represent APIs, messaging systems or event systems used by the central control system 10 to retrieve or store data.

When processing a received request, the central control system 10 may additionally be configured to access and retrieve information from one or more external information provider servers 24A, 24B, 24C. Each of these external information provider servers 24A, 24B, 24C comprises an interface 25 which is configured to provide the requested information to the central control system 10. They further comprise one or more databases 26A, 26B, 26C where the requested information is stored, and that the interface 25 is configured to access upon receipt of an information request from the central control system 10. The external information provider servers 24A, 24B, 24C may also communicate with the central control system 10 through APIs, event systems or messaging systems. The information which is requested comprises any information which assists the central control system 10 in performing its functionality, namely processing requests which have been generated by the remote interaction units 18A, 18B, 18C, 18D. The requested information may also comprise information which is not available from the one or more local databases 12, 14, 16.

In particular, the fact that the central control system 10 is able to access external information provider servers 24A, 24B, 24C offers a distinct advantage when processing the requests for determining an action to be taken by the remote interaction units 18A, 18B, 18C, 18D. Both the central control system 10 and remote interaction units 18A, 18B, 18C, 18D in prior systems would have access to localised information, however, as discussed above, there are often external factors which may have a direct impact upon the remote interaction units 18A, 18B, 18C, 18D and the local environments 20A, 20B, 20C, 20D in which they operate. These may take the form of non-localised external CERs as discussed above. With only localised information, the calculation of an action to be taken will be necessarily unable to take into account these external factors and as a consequence, the resulting action that is taken may be sub optimal. This may necessitate a later adjustment in the actions which are taken and in some scenarios, the sub-optimal action may not be correctable to the extent of achieving the initial desired aim. In providing access to external information provider servers 24A, 24B, 24C, the central control system 10 is able to include information regarding these external factors in its calculations, where the information may comprise both current and future predictions regarding such external factors. In some embodiments, information relating to external CERs may also be available in the internal databases 12, 14, 16 of the central control system 10. This may arise for example when the central control system 10 has previously retrieved and stored such information from external information provider servers 24A, 24B, 24C.

It is to be understood that in the following description, where reference is made to the calculation of a requested control parameter, this calculation additionally includes calculating the effect of the corresponding action to determine whether the calculated value of the control parameter adheres to the supplied CERs and therefore whether the action to be taken will enable the remote interaction unit 18A, 18B, 18C, 18D to act within the specified constraints.

The central control system 10 is configured such that, when a received request has been processed, the results are to be transmitted to the remote interaction unit 18A, 18B, 18C, 18D upon the central control system 10 receiving a request from the remote interaction unit 18A, 18B, 18C, 18D for the result of the calculation (i.e. a pull request). A pull system is advantageous in the present system where the remote interaction units 18A, 18B, 18C, 18D are located separately from the central control system 10, and where communications between the two elements are susceptible to disruption due to the local environment 20A, 20B, 20C, 20D of the remote interaction unit 18A, 18B, 18C, 18D e.g. the local environment 20A, 20B, 20C, 20D being situated in an area with poor wireless communications coverage. The remote interaction unit 18A, 18B, 18C, 18D may be configured such that it only requests a result of a calculation when it is ready to receive that calculation, for example when such a request can be reliably retrieved from the central control system 10. The remote interaction unit 18A, 18B, 18C, 18D may also be configured such that any components relating to the transmission and receipt of wireless signals are powered down when not in use, thereby lowering the overall power consumption of the remote interaction unit 18A, 18B, 18C, 18D. Returning to the electric vehicle example provided above, this is of particular use as electrical power may comprise the resource to be distributed, and reducing unnecessary power consumption may be key to the efficient functioning of the remote interaction unit 18A, 18B, 18C, 18D. Furthermore in a distributed system with thousands of remote interaction units, the central server can get very busy if it is constantly trying to push a calculation result to the plurality of remote interaction units. This bottleneck and drain of processing resource is avoided by using the pull system of the present embodiment.

In some embodiments of the central control system of FIG. 1A, the central control system may be configured to receive requests from a remote interaction unit 18A, 18B, 18C, 18D acting as a proxy, which request a calculation for an alternate remote interaction unit. Returning to the electric vehicle example, this may comprise a convoy control unit which is configured to submit requests for determining an action to be taken by one or more electric vehicles in a convoy. In such embodiments, the SER which is to be calculated by the control system (10) may comprise an external CER 218A, 218B, 218C, in so much as it is external to the remote interaction unit 18A, 18B, 18C, 18D which made the original request. In this case, the action to be taken may not affect the operating conditions of the local environment 20A, 20B, 20C, 20D of the remote interaction unit 18A, 18B, 18C, 18D which made the request. Instead, it may affect the operating conditions of an environment local to the alternate remote interaction unit to whom the request relates.

In some embodiments, the central control system 10 may be configured to be able to perform one type of calculation, corresponding to one SER (although the calculation may be performed in respect of a plurality of remote interaction units). Returning to the electric vehicle example described above, the electric vehicles 18A, 18B, 18C, 18D may be configured to send a request upon triggering a particular condition. For example, this may comprise when the vehicle reaches a particular electric charge level and subsequently will need to recharge shortly. In this example, the SER (being the electric charge level), would be the same for all requests received from all remote interaction units 18A, 18B, 18C, 18D. As a result, the central control system 10 may not need to be provided with the specified SER (charge level which is desired) as this may already be known to the system. Similarly the system (10) may not need to calculate the current SER (charge level currently) as this will be known (predetermined) from the receipt of the specific triggered request, since it may be configured to only perform a determination of the control signal in terms of the requested control parameter (for example speed) in this single scenario. Information regarding the SER may be stored within the one or more local databases 12, 14, 16.

Figure 2A:
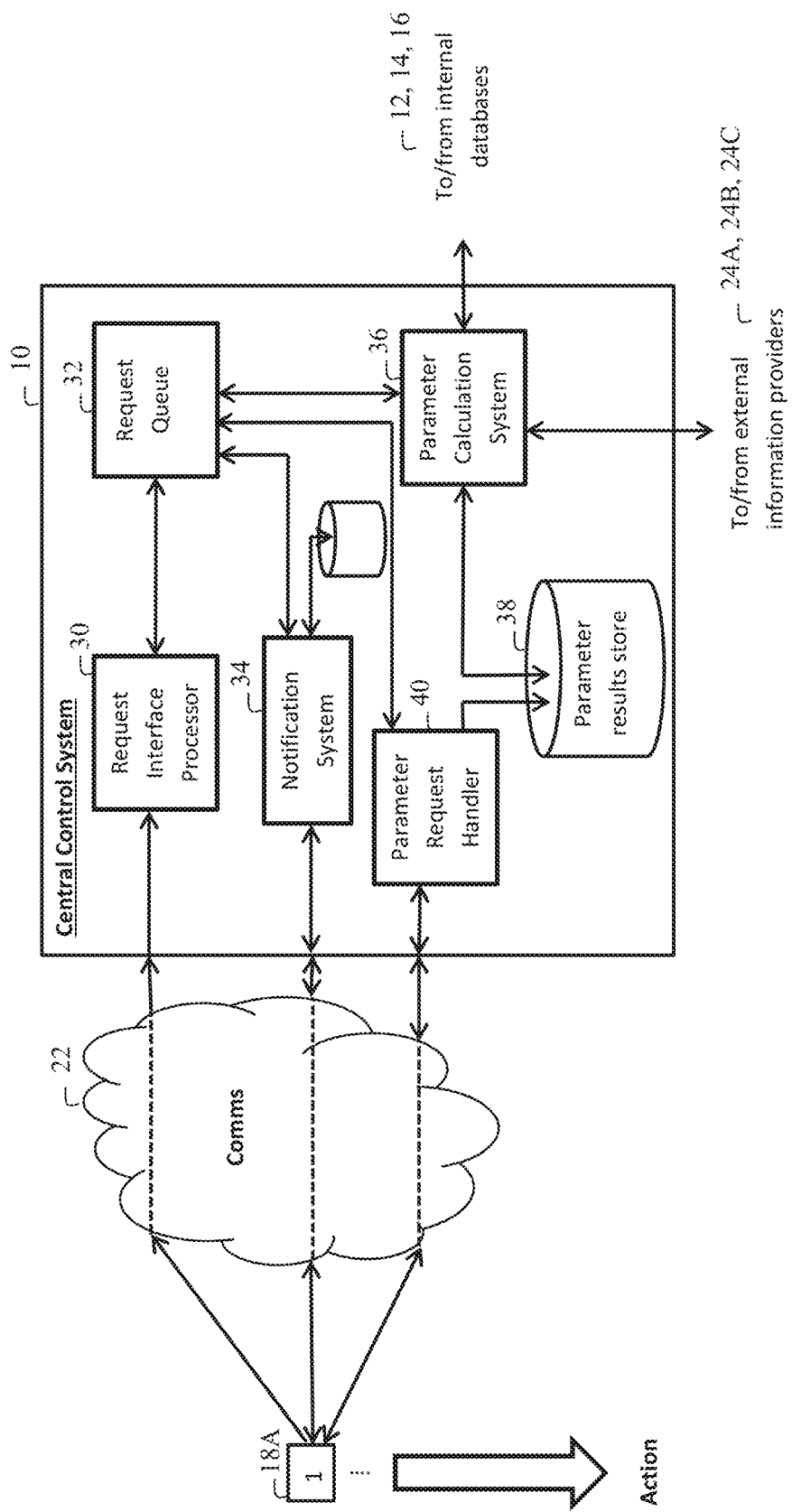
FIG. 2A is a schematic block diagram, showing a first embodiment of the central control system of FIG. 1A for providing remote interaction units with control signals according to an embodiment of the present invention.

Referring now to FIG. 2A, the central control system 10 according to a first embodiment of the present invention is shown in greater detail, This system 10 processes requests for determining an action to be taken and generates control signals to instruct execution of that action on the one or more remote interaction units 18A, 18B, 18C, 18D. In FIG. 2A, for the purposes of clarity, there is only one remote interaction unit 18A shown, however it is to be understood that multiple remote interaction units 18A, 18B, 18C, 18D may submit requests and these requests may be handled by the central control system 10 simultaneously in parallel according to an embodiment of the present invention. The remote interaction units 18A, 18B 18C, 18D are typically configured to transmit requests to the central control system 10 via the external communications network 22.

The central control system 10 comprises a request interface processor 30 which receives a request from the remote interaction unit 18A. The request interface processor 30 is configured to receive and process the received requests such that they are in a suitable format to be further processed by the central control system 10. The information processing may include determining what information needs to be retrieved by the central control system 10 in order to carry out the request. Furthermore, the processing may include dividing a single request into a plurality of requests or appending automatically generated information (e.g. date, time stamp, unique identifier) to the data structure of the request. The data structure of the request is configured in order to instruct the request interface processor 30 which information will need to be retrieved. The data structure of the request may additionally include a unique request identifier which enables the request to be subsequently tracked by the central control system 10 and the remote interaction unit 18A.

As the requests are received via the external communications network 22, it is conceivable that the requests may undergo some form of data corruption as they are being transmitted, or that the remote interaction unit 18A did not provide all of the information necessary to process the request. In some embodiments of the present invention, the request interface processor 30 may additionally be configured to verify the veracity and integrity of the requests and only process them if the data is complete and uncorrupted.

Once a request has been processed, the request may then be passed to a request queue 32 which is coupled to the request interface processor 30, where it is held until the request is able to be processed. The request queue is additionally coupled to a notification system 34 which is configured to maintain a real-time record of the status of the request, in particular whether the request is awaiting processing, if it is being processed, or if it has been processed. For example, when the request enters the queue 32, an instruction is sent to the notification system 34 indicating that the status of the request should be updated to indicate that it is awaiting processing. The notification system 34 is also configured to receive queries from the interaction unit 18A for information regarding the status of the initial request for information, and is then further configured to provide this request status information to the remote interaction unit 18A upon receipt of this query.

In an embodiment of the present invention where the request interface processor 30 is configured to verify the veracity and integrity of the request as described above, the request interface processor 30 may also be configured to notify the remote interaction unit 18A if a request cannot be processed. This is achieved, for example, by the request interface processor 30 being further coupled to the notification system 34, and where a request cannot be processed, the request interface processor 30 is configured to send an instruction to the notification system 34 indicating that the status of the request is that it is unable to be processed.

Returning now to the request queue 32, the queue 32 is further coupled to a parameter calculation system 36, which is configured to process the request and calculate the value of the control parameter which was initially requested by the remote interaction unit 18A. When it is determined that a request at the top of the queue 32 is able to be processed, the queue 32 is configured to provide the request to the parameter calculation system 36 so that the requested control parameter may be calculated. At this point, the queue 32 is also configured to instruct the notification system 34 that the status of the request has changed to a state that it is being processed. The parameter calculation system 36 is configured such that it can request information from any internal databases 12, 14, 16 and external information provider servers 24A, 24B, 24C as required in order to calculate the requested control parameter. The information which is requested may be determined as part of the initial request. The information may be accessed in accordance with the description given above.

The parameter calculation system 36 is additionally coupled to an internal parameter results store 38. Upon completion of the control parameter calculation, the parameter calculation system 36 is configured to store the results of the calculation in the parameter results store 38, along with any additional information which allows the calculation result to be associated with the request which initiated its calculation. For example, this may comprise the unique identifier as discussed above. When the calculated control parameter has been stored by the parameter results store 38, the parameter calculation system 36 is additionally configured to inform the request queue 32 that this calculation has been completed. The request queue 32 will then subsequently instruct the notification system 34 to update the status of the request to indicate that the control parameter has been calculated.

The central control system 10 is further provided with a parameter request handler (transmitter) 40 which is coupled to the parameter results store 38. The parameter request handler 40 is configured to receive pull instructions from the remote interaction unit 18A, 18B, 18C, 18D to access the parameter results store 38 to retrieve a calculated control parameter associated with a particular request and subsequently provide this calculated control parameter to the remote interaction unit 18A as an effective control signal for that remotely-located interaction unit. Such an instruction may be initiated by the remote interaction unit 18A determining from the notification system 34 the status of a request, namely that a control parameter has been calculated and is therefore ready to be retrieved and subsequently instructing that it be retrieved. In order to access a calculated control parameter associated with a particular request, the instruction from the remote interaction unit 18A may include information such as the unique identifier discussed above, and the parameter request handler 40 may be configured to use this information to retrieve the correct calculated control parameter from the parameter results store 38. The parameter request handler is further configured to be coupled to the request queue 32. Upon the requested control parameter being retrieved and supplied to the remote interaction unit 18A, the parameter request handler 40 will inform the request queue 32 that the control parameter has been retrieved and that the request may be removed from the queue 32. The request queue 32 will then subsequently instruct the notification system 34 to update the status of the request to indicate that the control parameter has been retrieved. In a further embodiment, notifications which are stored in the notification system 34 may be configured such that they are removed after a set period of time after the control parameter has been calculated. This prevents the notification system from becoming overloaded with outdated or irrelevant notifications. Similarly the request may be removed from the request queue 32 at this time, in some embodiments.

Once the control parameter has been supplied to the remote interaction unit 18A, an action may be automatically initiated by the remote interaction unit 18A on the basis of the supplied control parameter. In another embodiment of the present invention, the parameter request handler 40 may be configured to send a command signal to the remote interaction unit 18A which commands the remote interaction unit 18A to take a particular action on the basis of the calculated control parameter.

Figure 2B:
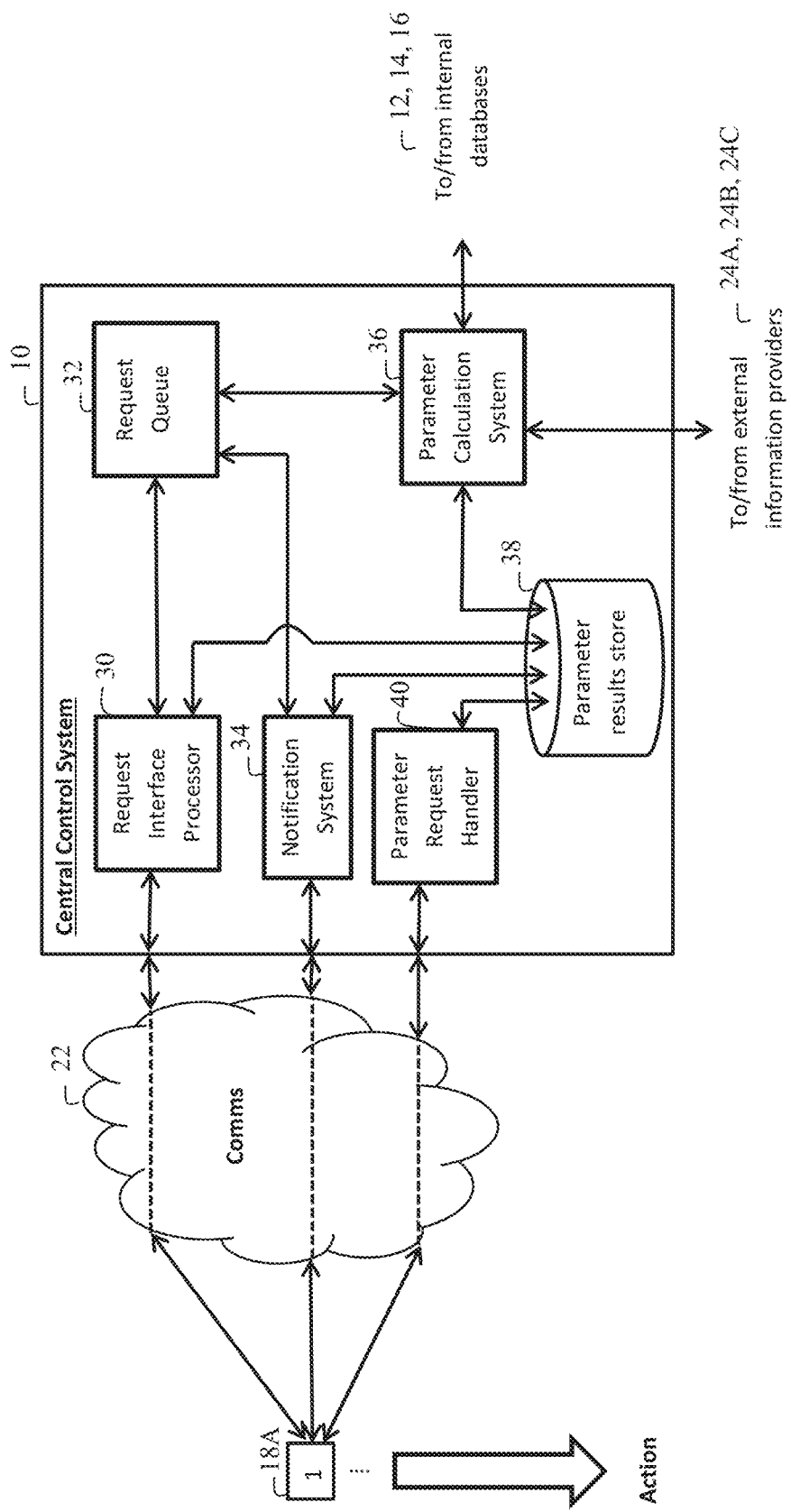
FIG. 2B is a schematic block diagram, showing a second embodiment of the central control system of FIG. 1A for providing remote interaction units with control signals according to an embodiment of the present invention.

Referring now to FIG. 2B, there is shown in greater detail another embodiment of the central control system 10 of the present invention wherein the system is configured to remove one or more information parameters from the request data structure and storing them in the parameter results store 38 whilst the request is undergoing processing. This may comprise storing all information parameters which are not required to identify the request. By way of example, this may comprise storing all of the information parameters apart from the unique request identifier. The data structure of the request is configured to allow the separation of information parameters to allow them to be removed from the request and stored in the parameter results store 38. The data structure of the request is described below in more detail with reference to FIG. 3. This embodiment enables the size of the data request which is transmitted between the request interface processor 30, the request queue 32, the notification system 34 and the parameter calculation system 36 to be minimised, thereby increasing the speed at which the requests may be transmitted, consequently increasing the overall speed of processing, Typically, the information parameters to be stored will only be required during certain stages of the processing of the request. In this embodiment, these information parameters are only accessed as and when is required so as to enable the processing of the request.

It is to be appreciated that the function of individual components and overall general functionality of the central control system 10 remains the same as described above with respect to other embodiments. For this reason and for the sake of brevity, the following description will only focus on the differences between the central control system 10 of FIG. 2A and of the current embodiment shown in FIG. 2B.

In this embodiment, requests are received by the request interface processor 30 from the remote interaction unit 18A. Upon receipt of the request data, the request interface processor 30 is configured to first identify which information parameters are required to enable the request to be identified by the request queue 32, the notification system 34 and the parameter calculation system 36. In some embodiments, this may comprise the unique request identifier. The information parameters which are not required are then removed from the data request structure and are passed to the parameter results store 38 which is communicably coupled to the request interface processor 30. These information parameters are then stored in the parameter results store 38. The information parameters which are stored may include information relating to the processing status of the request. When such a parameter is initially requested, if the requested control parameter is able to be calculated, the status may be noted as 'awaiting processing.' In embodiments where the request interface processor 30 is configured to determine the veracity and integrity of the initial request, the status may be noted as 'cannot be processed,' and the request will not proceed to the request queue 32. In some embodiments, the request interface processor 30 may then be configured to notify the remote interaction unit 18A, 18B, 18C, 18D that the request cannot be processed, as described in previous embodiments.

The information parameters which are required to identify the request as described above may be copied, transmitted and stored in association with the removed information parameters. This is to allow the removed information parameters to be associated with a particular request when they are subsequently accessed.

The information parameters which have not been segregated from the request data structure are then passed to the request queue 32, where the request will be held until it is ready to be processed. The request then proceeds through the central control system in a manner analogous to the embodiments described previously. When the request reaches the parameter calculator system 36 in order to calculate the requested control parameter, the remaining information parameters contained in the request data structure may not be sufficient to instruct the parameter calculation system 36 how to perform the calculation. In this embodiment, when the request data is received by the parameter calculation system 36, the parameter calculation system 36 is configured to retrieve the stored information parameters for the request from the parameter results store 38 to which it is communicably coupled. To enable this, the parameter calculation system 36 is configured to use the identification information parameters to query the parameter results store for the relevant information parameters and subsequently retrieve them to be used in the control parameter calculation. Upon completion of the calculation, the parameter calculation system 36 is configured to update any information parameters stored in the parameter results store 38 relating to the status of the request to read as 'processed.' This may be performed in conjunction with notifying the request queue 32 that the calculation has been completed in order to instruct the notification system 34 to notify the remote interaction unit 18A of such, or may be performed in conjunction with storing the calculated control parameters in the parameter results store 38.

The notification system 34 is additionally communicably coupled with the parameter results store 38 in order to retrieve the stored information parameters when notifying the remote interaction unit 18A of the status of the request. For example, when the notification system is instructed to provide a notification that the calculation has been completed, the notification system 34 may retrieve information parameters pertaining to the status of the request or any other required information using the identification information parameters, before transmitting the notification.

In further embodiments of the central control systems 10 of FIGS. 2A and 2B, the central control system 10 may be configured to automatically notify a remote interaction unit 18A, 18B, 18C, 18D when a control parameter has been calculated. This notification may take the form of a push notification which is sent from the notification system 34 when the request queue 32 instructs the notification system that the requested control parameter has been calculated. This may be of particular use in an embodiment described above when the remote interaction unit 18A, 18B, 18C, 18D which has submitted the original request is different to the remote interaction unit 18A, 18B, 18C, 18D for which an action is to be determined. In this scenario, the second of these remote interaction units 18A, 18B, 18C, 18D may be unaware that it needs to take an action in association with the original request. As a result, the second remote interaction unit 18A, 18B, 18C, 18D may be inefficient for it to be arranged in such a way that it is making periodic speculative pull requests for notifications. As a result, it is more efficient to arrange the central control system 10 to provide a push notification when an action is required. It is to be appreciated however that the push notification arrangement may be utilised in conjunction with the pull systems of previous embodiments. For example, the remote interaction units 18A, 18B, 18C, 18D may be able to initiate a pull instruction for a calculated control parameter.

Furthermore in certain embodiments, when the parameter calculation system 36 completes the calculation, the instruction which is sent to the request queue 32 to notify the remote interaction unit 18A, 18B, 18C, 18D may not be processed immediately. Instead, the parameter calculation system 36 may be configured to send a request to send this notification to the request queue 32. The notification is then only sent to the notification system 34 once the request reaches the top of the request queue 32. In such an embodiment, the request queue 32 is configured to distinguish between this type of request, and a request for a control parameter calculation. Upon determination of the type of request, the request queue will then perform an action in accordance with the type of request. The method which the request queue undergoes is described in more detail below, with reference to FIGS. 4A, 4B and 4C.

Figure 3:
FIG. 3 is a schematic block diagram, showing an example of a request data structure showing the information provided by a remote interaction unit which is used for calculating a requested control parameter by the system shown in FIG. 2A or FIG. 2B.

Turning to FIG. 3, there is shown an example data structure 230 of a request which can be sent by the remote interaction unit 18A, 18B, 18C, 18D to be received by the request interface processor 30. The data structure 230 comprises a plurality of information parameters, which may be used both to uniquely identify the request and to determine how the central control system 10 should process the request in order to provide the value of a requested control parameter (RCP). These information parameters may all be configured to be invariable or static throughout the process of the request. In this instance, a new request would need to be submitted if any of the information parameters changed. Alternatively, the structure may be configured such that the information parameters may be varied upon instruction from the remote interaction unit 18A, 18B, 18C, 18D. This allows the possibility of a remote interaction unit 18A, 18B, 18C, 18D being able to send an alteration to a request in the form of a shorter update request which has been previously sent without requiring that an entirely new request be sent.

The information parameters may comprise a unique request identifier 232, which may be assigned to the request on receipt by the request interface processor 30, or may be assigned when the remote interaction unit 18A, 18B, 18C, 18D initiates the parameter calculation request. The information parameters may further comprise the source of the request 234 identifying the remote interaction unit 18A, 18B, 18C, 18D which the request originated from. The information parameters may yet further comprise an identification of the requested control parameter (RCP) which is to be calculated by the remote interaction unit 18A, 18B, 18C, 18D. Similarly, the information parameters may comprise the current value of the RCP to be calculated 238. This may be provided in order to process the request, as described below. In some embodiments, the current value of the RCP may not be known and may need to be calculated and therefore this may not always be provided. This may arise when the calculation of the current value of the RCP requires information regarding the local CERs of one or more remote interaction units 18A, 18B, 18C, 18D which did not make the initial request. The information parameters may also comprise the status of the request to be processed 236, which will typically be updated as the request progresses through features of the central control system 10.

The information parameters may yet further comprise one or more CERs 240, 242, 244 which the calculation takes into account when suggesting a value of the control parameter, including an SER 240 which is specified by the remote interaction unit 18A, 18B, 18C, 18D in accordance with an embodiment described above. The SER specified in each request takes a fixed value for that request and is directed to a specified environmental constraint which is desired to be met. When a remote interaction unit 18A, 18B, 18C, 18D requests a control parameter to be calculated so that an action may be executed, it will typically also require that the resulting action leaves the corresponding local environment 20A, 20B, 20C, 20D in adherence to certain operating conditions. This information is taken into account when preparing the control parameter calculation. The information parameters may yet further comprise identifiers of required information 246, 248, 250 that the central control system 10 will need to retrieve from local databases 12, 14, 16 and/or external information provider servers 24A, 24B, 24C in order to process the request. These may include requests for external CERs, requests for appropriate calculation rules 11A, 11B, 11C and historical information which relates to the present request. In alternate embodiments, such required information 246, 248, 250 may be identified by the central control system 10 without being prompted by the request. This may be enabled by the system being able to identify such required information when assessing the control parameter to be calculated.

In certain embodiments where a remote interaction unit 18A, 18B, 18C, 18D initiates a request for a second remote interaction unit, the data structure 230 may further contain a proxy information parameter relating to the remote interaction unit 18A, 18B, 18C, 18D for which the calculation is to be performed in respect of.

Figure 4A:
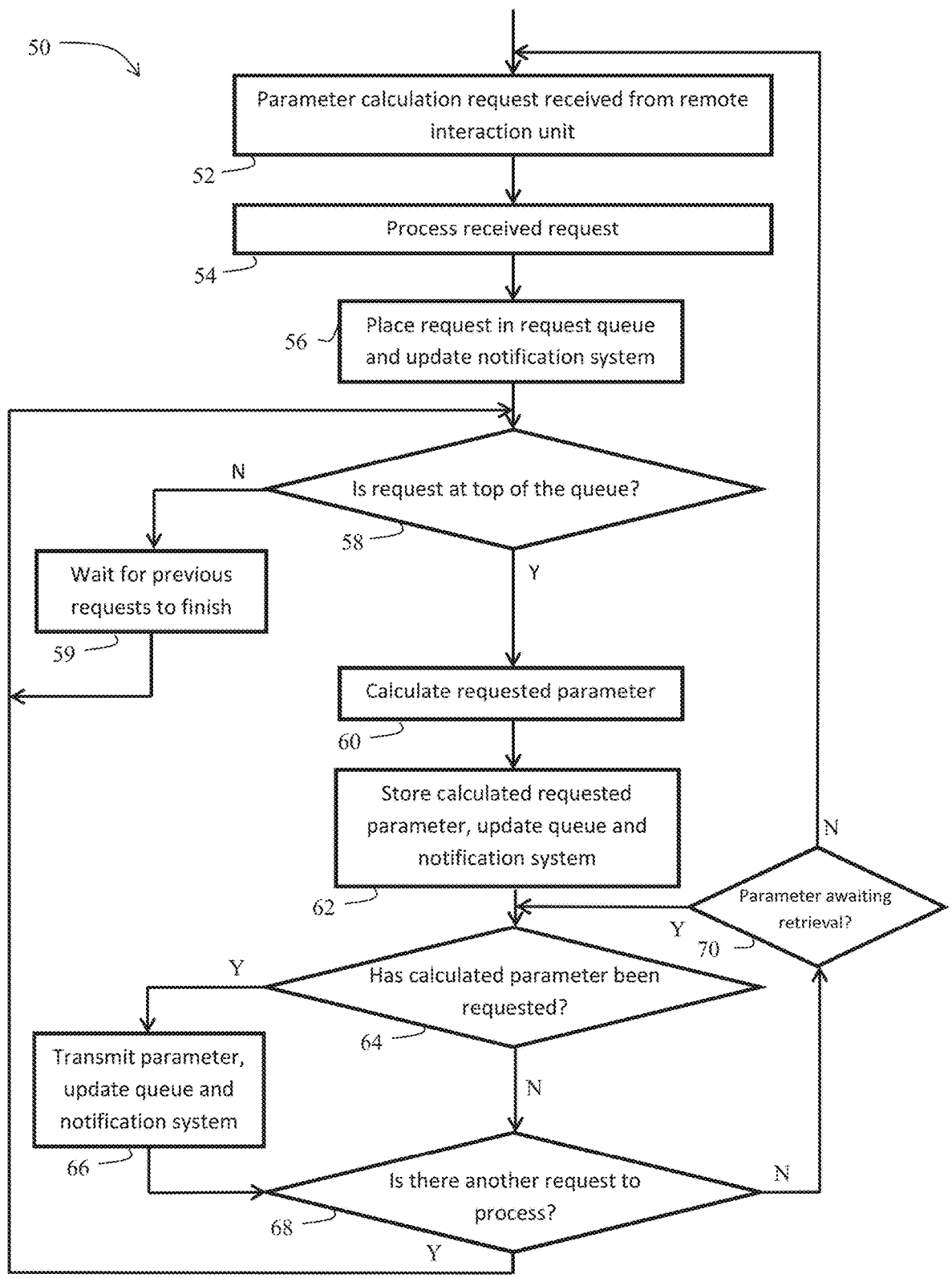
FIG. 4A is a flow diagram, showing a method of processing received requests from remote interaction units and providing them with control signals by the central control system of FIG. 2A or FIG. 2B.

FIG. 4A shows in detail a method of operation 50 of an embodiment of the central control system 10. The system 10 commences operation when a control parameter calculation request is received, at Step 52, from a remote interaction unit 18A, 18B, 18C, 18D, in accordance with the embodiment described above. The request is received by the request interface processor 30. Following the receipt of the request, the request itself is processed, at Step 54, by the request interface processor 30. This processing may comprise any one or more of ensuring that the request is in a suitable format for further processing by the central control system 10, determining what information is required in order to process the request, assigning a unique identifier to the request and verifying the veracity and integrity of the requests to ensure that the request can be processed.

Following this, the request is placed, at Step 56, into the request queue 32 and simultaneously an instruction is sent to the notification system 34 to generate an entry corresponding to this request and to designate its status as 'being processed.' Once the request is situated in the queue 32, it is then determined, at Step 58, whether the request is at the top of the queue 32 and therefore whether the request can be processed. It is to be understood that in embodiments of the present invention, it may be possible that a previous request remains in the queue whilst no longer being processed. This may be the case when a request is only removed when the control parameter has been calculated and retrieved, in accordance with the description above. In this case, for a present request to be at the top of the queue 32 requires only that it is the top of the queue of requests which have a status of 'unprocessed' or 'being processed'. Additionally, in certain embodiments, the parameter calculation system 36 may be capable of processing multiple requests simultaneously. In this case, for a present request to be at the top of the queue 32 requires that it is at the top of the queue of requests which have a status of 'unprocessed' and that whilst other requests may be being processed, there is sufficient resource within the system to additionally process the present request.

If it is determined that the request is at the top of the queue according to any of the embodiments described above then the request and any additional metadata is passed to the parameter calculation system 36 and the control parameter is then calculated at Step 60. The steps involved in calculating the control parameter are discussed further below. If, however, it is determined, at Step 58, that the request is not at the top of the queue 32 in accordance with a relevant embodiment, then the system 10 is configured to wait, at Step 59, until it is at the top of the queue 32 in accordance with the relevant embodiment. Once it has then reached the top of the queue 32, the request is passed to the parameter calculation system and the control parameter is calculated at Step 60.

Once the control parameter is calculated it is stored, at Step 62, in the parameter results store 38. At this point, the request queue 32 is notified of the storing of the calculated control parameter and accordingly, an instruction is sent to the notification system 34 to update the entry relating to the corresponding request to designate its status as 'processed.' When the calculated control parameter is stored in the parameter results store, the result of the calculation may also be stored in one or more of the internal databases 12, 14, 16 such that they are accessible by the parameter calculation system 36 in future calculations. The calculation results stored in the one or more internal databases 12, 14, 16 may be configured to be different from the information stored in the parameter results store. For instance, the information stored in the databases 12, 14, 16 may contain data relating to the conditions of the request or required information relating to the performed calculation. This presents the advantage of allowing any subsequent requests for the same control parameter in the same conditions to be fulfilled more quickly as no active calculation may be required, as it would simply be a case of information retrieval from one of the databases. Additionally, this configuration allows easier data validation and maintenance/troubleshooting.

Returning to the described process 50, once the calculated control parameter has been stored, at Step 62, the system 10 is configured to determine, at Step 64, whether the remote interaction unit 18A, 18B, 18C, 18D has requested that the control parameter be retrieved from the parameter results store 38, via the parameter request handler 40. This will typically occur after the remote interaction unit 18A, 18B, 18C, 18D has requested a status update from the notification system 34 and has been informed that the control parameter calculation has been completed. If it is determined that the remote interaction unit 18A, 18B, 18C, 18D has requested that the control parameter be retrieved, then the parameter request handler 40 is configured to retrieve, at Step 66, the calculated control parameter from the parameter results store 38, and transmit the calculated control parameter to the remote interaction unit 18A, 18B, 18C, 18D which requested it. Simultaneously, the parameter request handler 40 will be configured to notify the request queue 32 that the control parameter has been retrieved and an instruction is sent to the notification system 34 to update the status of the request to be 'retrieved.' In accordance with some embodiments of the system 10 described above, when the calculated control parameter has been retrieved, the request queue 32 and/or the notification system 34 may be configured to delete the corresponding request so that the two components do not become overloaded with irrelevant or outdated requests.

Following Step 66, or if it is determined at Step 64 that the calculated control parameter has not been requested, the method 50 then proceeds to determine, at Step 68, if another request is available for processing. Such a request may have been received by the system 10 during the processing of the previous request. Alternatively, it may have been received after the previous request was received but before it was processed. If it is determined, at Step 68, that there is another request which may be processed, the method 50 then proceeds by returning to Step 58 and determines whether the request is at the top of queue 32 and is therefore ready to be processed. If, alternatively, it is determined that there are no more requests to be processed currently, the method 50 proceeds to determine, at Step 70, whether there are one or more control parameters which are still awaiting retrieval. If it is determined that there are still one or more control parameters which have not yet been retrieved, the method 50 returns to Step 64 where it is determined whether one of the control parameters have been requested. If instead it is determined that all control parameters have been retrieved, then the method returns to the beginning and awaits a new control parameter calculation request from one of the remote interaction units 18A, 18B, 18C, 18D.

In additional embodiments where some or all of the information parameters of the data request structure are to be stored in the parameter results store 38 during processing, the method of FIG. 4A may be suitably modified to achieve this. By way of example, Step 56 may be modified such that the request interface processor 30 separates one or more of the information parameters and stores them in the parameter results store 38 before placing the request in the request queue 32. Similarly, wherever the stored information is required, such as at Step 60, the method may be modified to include access to and/or modification of the stored information parameters.

Figure 4B:
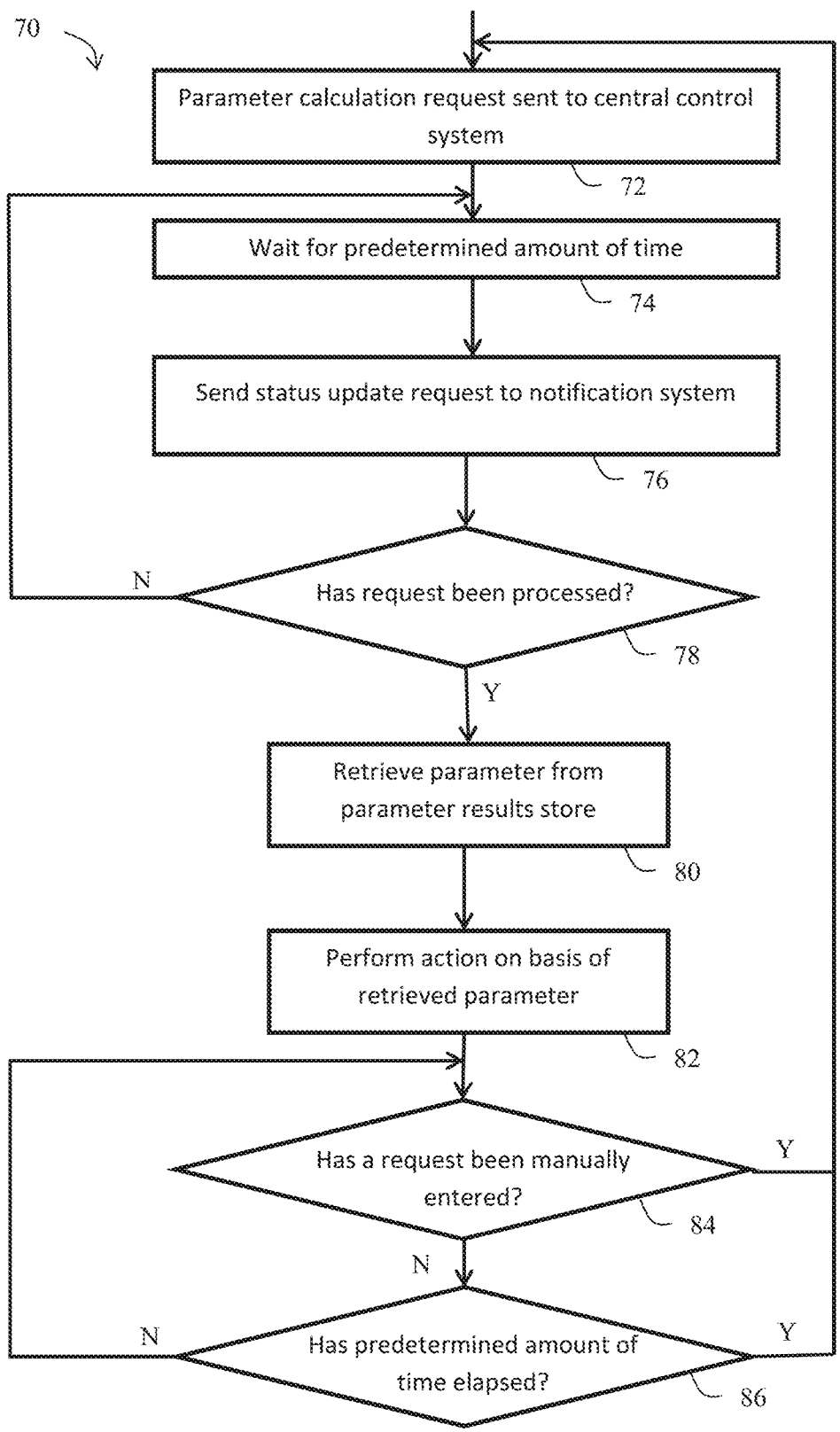
FIG. 4B is a flow diagram, showing a method of a remote interaction unit of FIG. 1A requesting a control signal from the central control system of FIG. 2A or FIG. 2B.

Turning now to FIG. 4B, there is illustrated a further procedure 70 which is carried out at a remote interaction unit 18A, 18B, 18C, 18D in sending a request for a value of a specified control parameter and subsequently retrieving the value of the control parameter from the central control system 10. This is provided in combination with FIG. 4A in order to illustrate the full procedure that a request undergoes combining both the aspects carried out by the central control system 10 and the remote interaction unit 18A, 18B, 18C, 18D. In particular, the procedure 70 described considers a remote interaction unit 18A, 18B, 18C, 18D which is operating in a real-time environment 20A, 20B, 20C, 20D and will send requests for a control parameter on a recurring (or periodic) basis in order to reflect the fact that conditions in the environment 20A, 20B, 20C, 20D may rapidly change. As such, a control parameter may be required to vary for the most efficient operation of a system in the environment 20A, 20B, 20C, 20D and this can be achieved by requesting the calculation of the control parameter in a recurrent fashion. The remote interaction unit 18A, 18B, 18C, 18D in this example may also be configured such that a manual request for a control parameter calculation may be sent to the central control system 10 at any time.

The procedure 70 at the remote interaction unit 18A, 18B, 18C, 18D commences by sending, at Step 72, a request to the central control system 10 to calculate the value of a specified control parameter.

In some embodiments, after the request has been sent, the remote interaction unit 18A, 18B, 18C, 18D is then configured to wait, at Step 74, for a predetermined amount of time before any further steps are enacted. This predetermined amount of time is introduced in order to allow the requested calculation to be performed by the central control system 10. The predetermined amount of time may be adjustable. This adjustment may be manually performed by a user of the remote interaction unit 18A, 18B, 18C, 18D. Alternatively, the remote interaction unit 18A, 18B, 18C, 18D may automatically adjust this time in dependence on associated factors, for example, the complexity of the request, whether the action for which the control parameter is required is time-critical, expected length of time taken to complete the request etc.

Once the predetermined amount of time has elapsed, the remote interaction unit 18A, 18B, 18C, 18D is then configured to request, at Step 76, a status update of the initial control parameter calculation request from the notification system 34 of the central control system 10, and receiving a notification of the status of the request, in accordance with the above description. Upon receipt of the status of the request, the remote interaction unit 18A, 18B, 18C, 18D then determines, at Step 78, whether the request has been processed by the central control system 10. If the control parameter calculation request has not yet been completed, then the procedure returns to Step 74 and waits for a further predetermined amount of time, where this amount of time may be either the same or different from the previous amount of time waited before sending the initial status update request.

If it is determined that the control parameter calculation request has been completed, then the remote interaction unit 18A, 18B, 18C, 18D is then configured to retrieve (pull), at Step 80, the calculated control parameter from the parameter results store 38. This may be achieved by transmitting a request for the calculated control parameter to the parameter request handler 40, where it is subsequently retrieved from the parameter results store 38 before being transmitted back to the remote interaction unit 18A, 18B, 18C, 18D in accordance with the description provided above. Once the control parameter has been received by the remote interaction unit 18A, 18B, 18C, 18D, the remote interaction unit then performs an action, at Step 82, on the basis of the retrieved control parameter. As discussed above, this action will typically comprise an action which affects the operating conditions of at least one corresponding system in the local environment 20A, 20B, 20C, 20D in which the remote interaction unit 18A, 18B, 18C, 18D resides. In embodiments where the remote interaction unit 18A, 18B, 18C, 18D initiates the request in respect of a control parameter to be calculated for a second remote interaction unit, the action which is taken will be affecting an environment local to the second remote interaction unit. In some embodiments of the central control system 10, the parameter request handler is configured to output a direct control signal to the remote interaction unit 18A, 18B, 18C, 18D. The control signal is configured to instruct the remote interaction unit 18A, 18B, 18C, 18D to perform an action on the basis of the calculated control parameter. In this manner, the central control system 10 may instruct appropriate actions to be taken by the remote interaction unit 18A, 18B, 18C, 18D without any further processing being required by the unit itself to interpret how to respond to a particular value of the specific control parameter.

Once the action has been enacted, the procedure 70 then continues by determining, at Step 84, whether a request for a control parameter calculation from the central control system 10 has been manually entered into the remote interaction unit 18A, 18B, 18C, 18D. If it has, then the procedure 70 then returns to Step 72 and the control parameter calculation request is sent to the central control system 10 to be processed. If a manual request has not been entered, the remote interaction unit 18A, 18B, 18C, 18D is configured to determine, at Step 86, whether a predetermined amount of time has elapsed. This predetermined amount of time comprises the amount of time between automatic control parameter calculation requests in an embodiment of the remote interaction unit 18A, 18B, 18C, 18D which is configured to send requests for a control parameter on a recurring basis. As above, the predetermined amount of time may be adjustable, either manually or automatically dependent on associated factors, some of which are discussed above. If the predetermined amount of time has elapsed, the procedure 70 returns to Step 72 and the request is sent to the central control system 10 as described previously. If the predetermined amount of time has not elapsed, then the procedure 70 returns to Step 84 and the remote interaction unit 18A, 18B, 18C, 18D determines whether or not a manual request for a control parameter calculation has been entered.

Figure 4C:
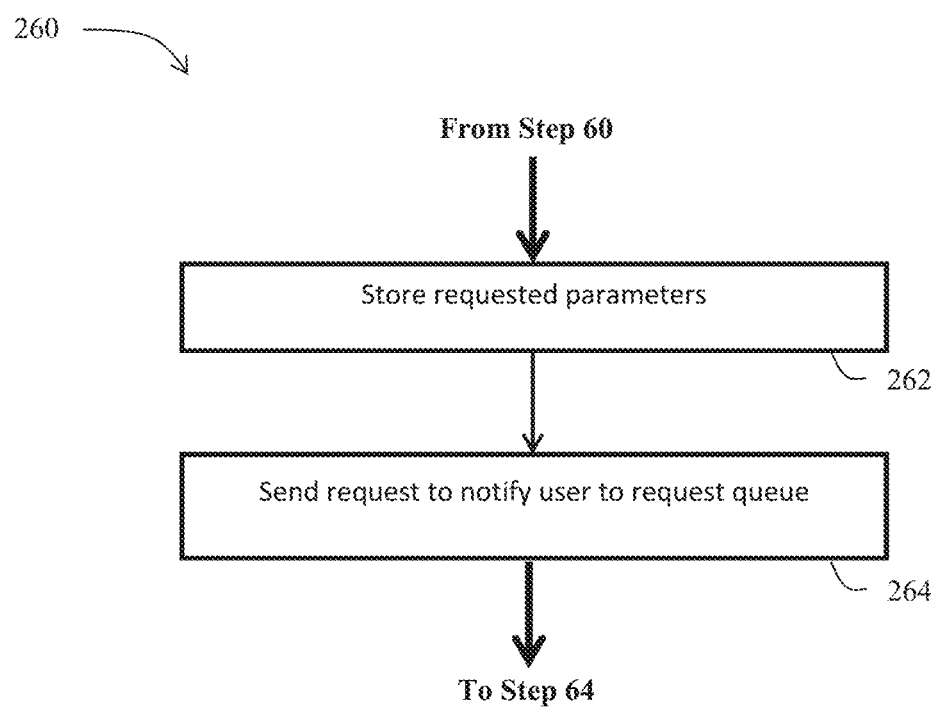
FIG. 4C is a flow diagram, showing a method of a parameter calculation system of FIG. 2A or 2B requesting that a push notification system be sent to a remote interaction unit of FIG. 1A.

Turning now to FIG. 4C, there is illustrated a further procedure showing a method of operation 260 of the parameter calculation system 36, in which the parameter calculation system 36 is configured to send a request to send a push notification to the request queue 32 to the remote interaction unit 18A, 18B, 18C, 18D upon completion of a control parameter calculation, wherein the request queue 32 is then configured to distinguish between a notification request and a control parameter calculation request and act accordingly. The operation of the request queue 32 in this embodiment is discussed in more detail with reference to FIG. 4D.

Returning to FIG. 4C, the procedure 260 begins when the parameter calculation store 38 completes, at Step 60, a control parameter calculation. After the calculation has been completed, the parameter calculation system 38 then stores, at Step 262, the requested control parameters in the parameter results store 38. In embodiments where information parameters are also stored in the parameter results store 38, the parameter calculation system 36 may also at this point update relevant information parameters where necessary. This may, for example, comprise updating the status of the request to read as 'processed.'

Once the requested control parameters have been stored in the parameter results store 38, the parameter calculation system 36 then sends a request, at Step 264, to the request queue 32 which requests that a push notification be sent to the relevant remote interaction unit 18A, 18B, 18C, 18D informing it that a control parameter for determining an action to be taken has been calculated and may be requested from the parameter request handler 40. The request is configured to enable the request queue to identify that it is a notification request, and to be able to identify the initial control parameter request it relates to. The procedure 260 then proceeds to determine, at Step 64, whether the calculated control parameter has been requested, in accordance with embodiments described above.

Figure 4D:
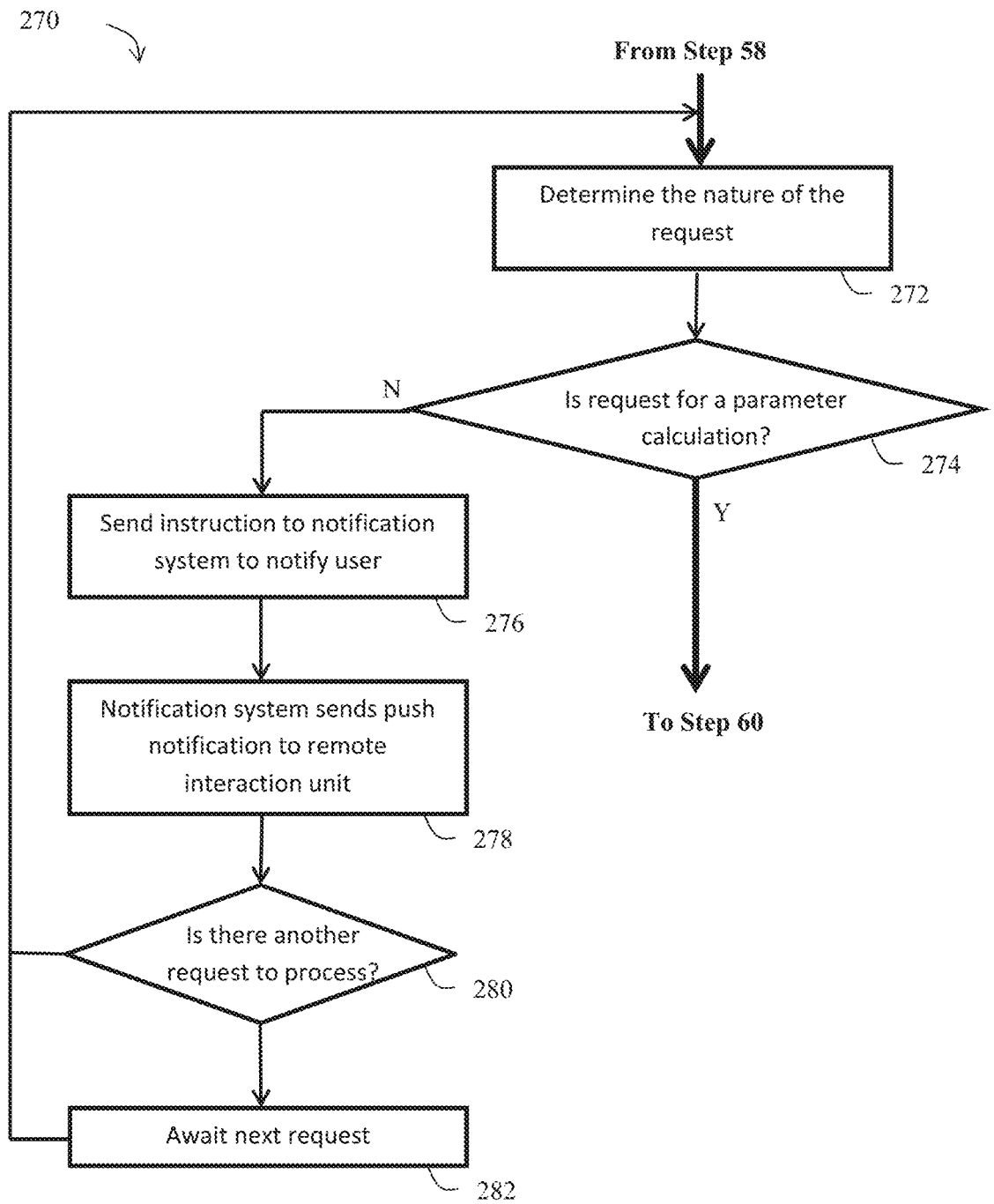
FIG. 4D is a flow diagram, showing a method of a request queue of FIG. 2A or 2B determining the nature of a request and acting accordingly.

With reference to FIG. 4D, there is shown a procedure 270 illustrating a method of operation for the request queue 32 in an embodiment where the request queue 32 is configured to receive requests for calculating a control parameter and for notifying a remote interaction unit 18A, 18B, 18C, 18D that a control parameter has been calculated. This may be used in conjunction with the methods illustrated in FIGS. 4A, 4B and 4C. The procedure 270 begins when it is determined, at Step 58, that a request is at the top of the queue. In this embodiment, the request may relate to either a control parameter calculation request, or a push notification request. The request queue 32 then determines, at Step 272, the nature of the request, i.e. whether it is a control parameter calculation request or a push notification request. If it is determined that it is a control parameter calculation request, the procedure then proceeds to calculate, at Step 60, the requested control parameter and continues in accordance with the procedures illustrated in FIGS. 4A and 4C.

If it is determined, at Step 274, that the request is in relation to a push notification request, the request queue 32 then sends, at Step 276 an instruction to the notification system 34 that a push notification should be sent to the relevant remote interaction unit 18A, 18B, 18C, 18D. The instruction may be configured to enable the notification system to be able to identify the initial control parameter request which the push notification is related to, in addition to which remote interaction unit 18A, 18B, 18C, 18D the notification should be sent to. This may comprise the remote interaction unit 18A, 18B, 18C, 18D that initiated the control parameter calculation request, or it may comprise a second remote interaction unit, in accordance with any of the embodiments described above.

The notification system 34 then sends, at Step 278, the push notification to the relevant remote interaction unit 18A, 18B, 18C, 18D. In such an embodiment, the remote interaction units 18A, 18B, 18C, 18D are configured to be able to receive and process such a request and subsequently act upon the information which is provided. When the push notification has been sent to the remote interaction system 18A, 18B, 18C, 18D, it is then determined, at Step 280, whether there is another request to process. If there is, the procedure 270 returns to Step 272 in order to determine the nature of the request. If it is determined at Step 280 that there is not another request to process, the request queue 32 waits, at Step 282, for the next request to enter the queue. Once a request is received, the procedure 270 returns to Step 272 and determines the nature of the request.

In some embodiments, the request queue may be further configured to additionally assign a preference to one category of request and preferentially process this type of request over others. For example, it may be deemed that control parameter calculation requests take precedence over push notification requests. In such embodiments, the request queue may be configured to review all requests in the queue and in the instance where a preferred request is scheduled to be processed after a less preferred request, the order of the queue is rearranged to place the preferred request higher in the queue. This can be advantageous when a plurality of control parameter calculation requests are submitted and it is preferable to calculate all of the control parameters before providing notifications of the completed calculations.

It is to be appreciated that in conjunction with the embodiment illustrated in FIGS. 4C and 4D, that the corresponding method 70 of the remote interaction unit 18A, 18B, 18C, 18D may be modified in order to enable a push request to be received and processed. This may for example comprise replacing Steps 74, 76 and 78 with a single step which comprises waiting for a push notification to be received. Similarly, the method 70 may be modified in the case where the remote interaction unit 18A, 18B, 18C, 18D requests a control parameter calculation for a second remote interaction unit. In this case, the method may be different for the remote interaction unit 18A, 18B, 18C, 18D which makes the request, and the second remote interaction unit. In such an embodiment, the method for the remote interaction unit 18A, 18B, 18C, 18D which makes the request may simply comprise Step 72, and the method for the second remote interaction unit may comprise replacing Steps 72, 74, 76 and 78 with a single step which comprises waiting for a push notification to be received.

Figure 5:
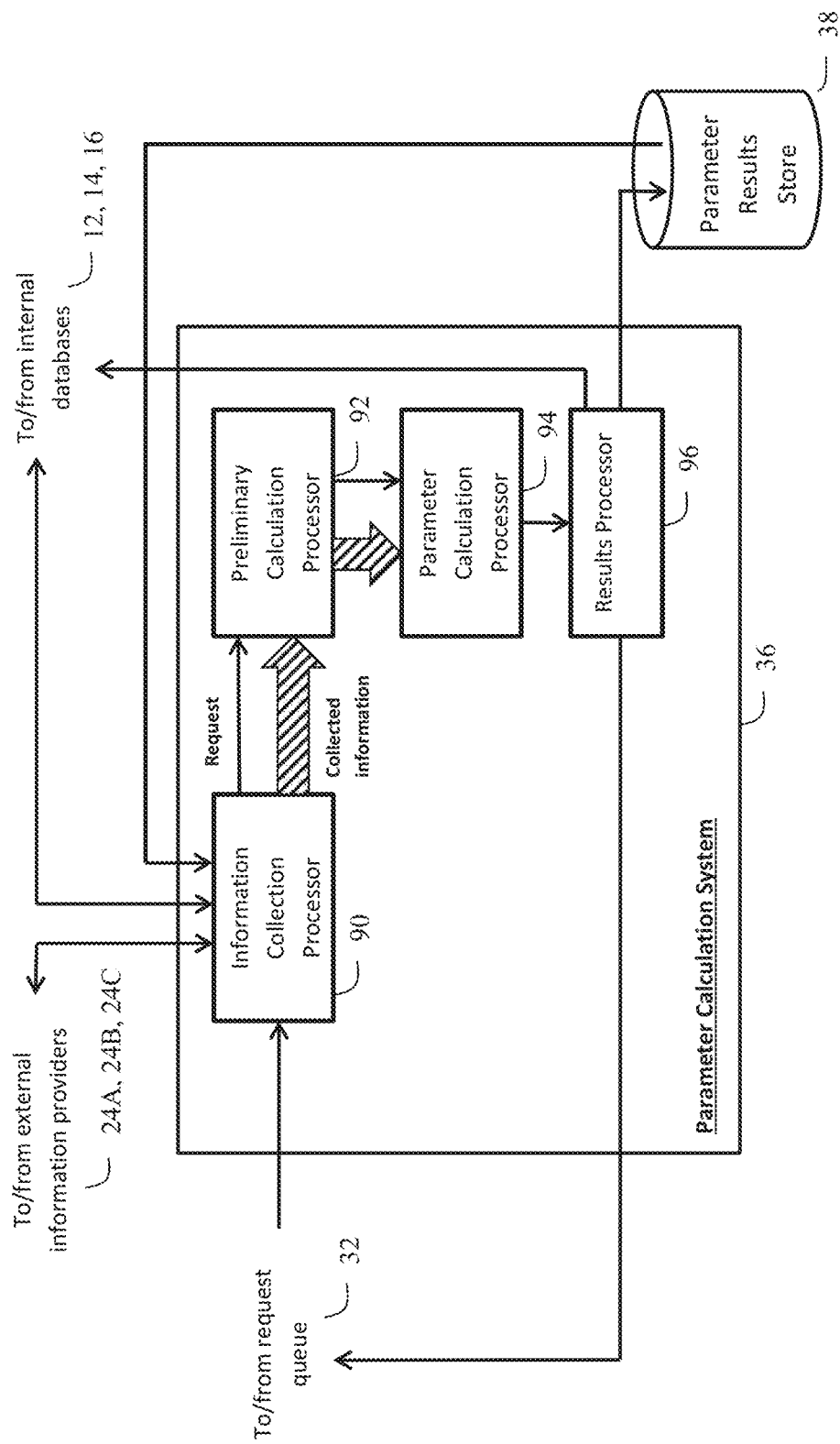
FIG. 5 is a schematic block diagram, showing a parameter calculation system of the central control system of FIG. 2A or FIG. 2B.

Returning to elements of an embodiment of the central control system 10 of FIGS. 1 and 2, FIG. 5 illustrates the parameter calculation system 36 in more detail. The parameter calculation system 36 first comprises an information collector processor 90, which is configured to receive a control parameter calculation request from the request queue 32. The information collection processor 90 is additionally configured to analyse any metadata relating to information which is required to perform the control parameter calculation request, and then subsequently retrieve this information. The information collection processor 90 is therefore appropriately configured to request the required information from the locations where the information is stored. This may include the internal databases 12, 14, 16 and the external information provider servers 24A, 24B, 24C previously described. The information itself may comprise any of the information which has been described above, including a set of prescribed rules 11A, 11B, 11C which are able to instruct the central control system 10 how to process a received request, qualitative and quantitative information relating to the remote interaction units 18A, 18B, 18C, 18D and their associated environments 20A, 20B, 20C, 20D, and information relating to previous requests which have been made by a remote interaction unit 18A, 18B, 18C, 18D.

Figure 9:
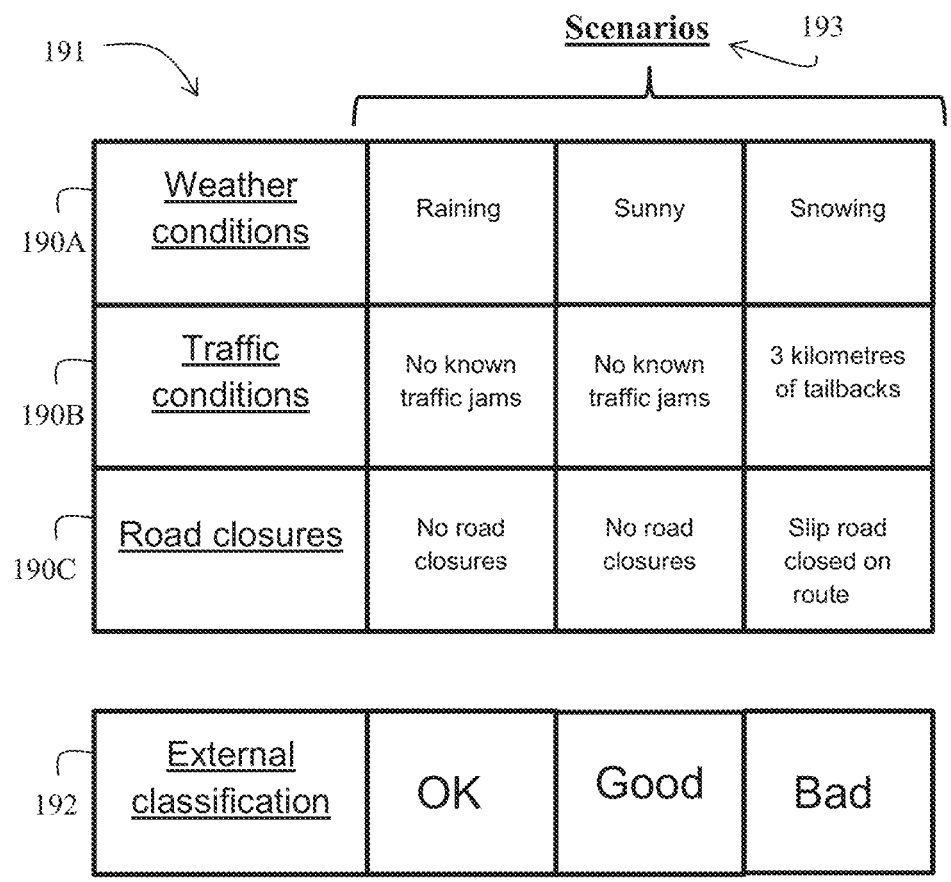
FIG. 9 is a tabular illustration, showing an example scenario of how external environmental constraints may be classified in a possible embodiment of the method of FIG. 8B.

The parameter calculation system 36 further comprises a preliminary calculation processor (or classification engine) 92 which is coupled to the information collection processor 90. The information collection processor 90 is configured to transmit the initial control parameter calculation request in addition with collected information associated with that request to the preliminary calculation processor 92. The preliminary calculation processor is then configured to perform any pre-processing of collected information which is required in order for the control parameter calculation request to be fulfilled. This may comprise performing initial calculations using the information collected which are required to perform the calculation of the control parameter itself. It may also comprise a form of aggregation of the collected information which is in a form suitable for further processing. This aggregation results in a form of classification of the collected information into aggregate parameters. The simplification of the multiple parameters into a single classification is carried out typically using a matrix structure 191 (as shown in FIG. 9). For example, the classification engine 92 is, in one embodiment, arranged to classify a plurality of current external environmental parameters (external CERs) associated with the remotely-located interaction unit 18A-D into a single external CER parameter 202A-C (see description of FIG. 9 later).

It is possible that in order for a single control parameter calculation request to be fulfilled, it will also be necessary for a plurality of initial calculations to be performed on the collected information. Each of these calculations may use different subsets of the collected information. The calculations may also rely on the results of a first calculation in order to process a subsequent calculation. Therefore accordingly in some embodiments of the present invention, the preliminary calculation processor 92 may additionally comprise a processing queue (not shown) which enables the required calculations or other pre-processing actions to be ordered. In such embodiments, the queue operates in accordance with known principles and will process each of the calculations or other pre-processing actions as it reaches the top of the queue. In further embodiments, the preliminary calculation processor 92 may be configured to process multiple calculations or pre-processing actions simultaneously. This may be achieved either with or without the use of a processing queue.

The parameter calculation system 36 also comprises a parameter calculation processor 94 which is coupled to a preliminary calculation processor 92. The parameter calculation processor 94 is configured to receive the request and any information which has undergone pre-processing from the preliminary calculation processor 92. The parameter calculation processor 94 is configured to utilise the pre-processed information to calculate the adjustment required of a current value of the requested control parameter to enable the remotely located interaction unit 18A-D to meet a specified value of the specified environmental requirement as determined by the initial request. The way in which this is achieved is described in more detail below. The results of this calculation and the request which they correspond to are then transmitted to a results processor 96 which is provided in the parameter calculation system 36 and which is coupled to the parameter calculation processor 94. The results processor 96 is configured to receive these results and process them such that they are in a suitable format to be stored in the parameter results store 38 of the central control system 10. The results processor 96 is further configured to store the results of the calculation and any relevant data in one or more of the internal databases 12, 14, 16. As described previously, this may enable any future control parameter calculation requests to be performed more quickly. The results processor is also configured to inform the results queue 32 that the calculation has now been performed such that the results queue 32 is then able to instruct the notification system 34 to update the status of the request to read as 'processed.' In some embodiments, the results processor 96 is configured to update information parameters stored in the parameter results store 38 relating to the status of the control parameter calculation request so that the status read as 'processed.'

A method of operation 100 of the parameter calculation system 36 is now described in greater detail with reference to FIG. 6. The method 100 commences when a request is received, at Step 102, by the information collection processor 90 from the request queue 32. The received request may comprise information relating to the control parameter whose value is to be calculated in accordance with an embodiment described above.

Following the receipt of a control parameter calculation request, the parameter calculation system 36 is configured, at Step 104, to retrieve the relevant information from the internal databases 12, 14, 16 and the external information provider servers 24A, 24B, 24C. This may be achieved by sending requests for the required information to the relevant source of information. The information collection processor may be configured to determine the most likely source for obtaining the requested information. The request may be sent using a suitable communications channel, including wired or wireless communication methods. Once a request is received by the internal databases 12, 14, 16 or the external information provider servers 24A, 24B, 24C, if the information is available, it will be sent back to the information collection processor 90 which is configured to receive the information which has been sent.

It is possible that in some rare cases, the information which is required to fulfil a control parameter calculation request is not available to the information collection processor 90. This may be because the information collection processor 90 is unable to communicate with the internal databases 12, 14, 16 and/or the external information provider servers 24A, 24B, 24C. Alternatively, the required information may simply not be available from all of the potential sources of information. Accordingly, in some embodiments of the present invention, if the required information is determined as not being available, then the information collection processor may be configured to communicate this information with the request queue 32. The request queue may then be configured to instruct the notification system 34 to update status of the request to be 'unprocessable.' The request may then also be configured to be removed from the request queue 32. In some embodiments, the information collector processor is configured to update information parameters stored in the parameter results store 38 relating to the status of the control parameter calculation request to be 'unprocessable'.

Returning to the scenario where the required information has all been retrieved, the information collection processor 90 is configured to pass this information to the preliminary calculation processor 92 where is configured to perform, at Step 106, any necessary pre-processing actions or calculations, where such actions or calculations have been described in detail above. This may be achieved using any of the embodiments of the preliminary calculation processor 92 which have been described above. In the case of an embodiment where the preliminary calculation processor 92 is provided with a processing queue, when the request and associated information is received by the preliminary calculation processor 92, each required pre-processing action is put into a queue and the action will be carried out by the preliminary calculation processor 92 when it is at the top of the queue. Examples of such pre-processing actions may comprise the calculation of the current value of the RCP. This may be required when the current value of the RCP is not submitted with the initial request. This may arise in scenarios in which the calculation of the current value of the RCP requires information regarding local CERs of one or more remote interaction units 18A, 18B, 18C, 18D which did not make the initial request.

Once the necessary pre-processing actions or calculations have been performed, the details of the control parameter calculation request, the information from the internal databases 12, 14, 16 and/or the external information provider servers 24A, 24B, 24C, and any pre-processed information are passed to the parameter calculation processor 94. The parameter calculation processor 94 is configured to calculate, at Step 108, the value of the control parameter which was initially requested by the remote interaction unit 18A, 18B, 18C, 18D. The way in which this is may be achieved is described in more detail with reference to FIGS. 6, 7A and 7B. Once the calculation has been performed, the results are passed, at Step 110, to the results processor 96. At this point the calculated result is stored in the parameter results store 38, any relevant internal databases 12, 14, 16 and a notification is sent to the request queue 32, in accordance with the method described with reference to FIG. 4A. In certain embodiments where information parameters associated with the status of the control parameter calculation request are stored in the parameter results store 38, an instruction is sent to the parameter results store 38 in order to update the status of the request to 'processed.'

Figure 7:
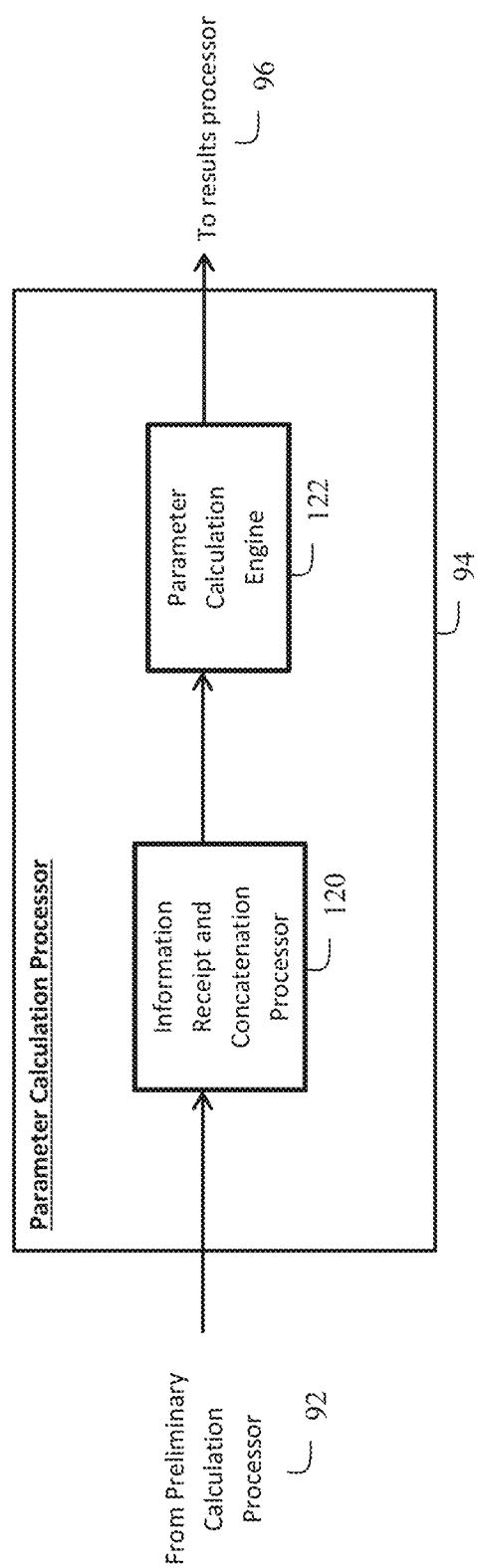
FIG. 7 is a schematic block diagram, showing a parameter calculation processor of the parameter calculation system of FIG. 5.

Returning to the embodiment of the parameter calculation system 36 of FIG. 5, there is shown in FIG. 7 a more detailed view of the parameter calculation processor 94. The parameter calculation processor 94 first comprises an information receipt and concatenation processor 120. This is configured to receive information provided by the preliminary calculation processor 92. The information which is provided may comprise the requested control parameter calculation. It may further comprise any relevant information which is required to calculate the requested control parameter, where this information may have been received from the internal databases 12, 14, 16 and/or the external information provider servers 24A, 24B, 24C, or it may also be the result of pre-processing performed by the preliminary calculation processor 92 as described above. The information receipt and concatenation processor 120 is additionally configured to determine when all of the information which is required to fulfil the initial control parameter request has been provided to it. This determination may be enabled by comparing information which has been received with information which has been determined as being required. This may be enabled by any suitable matching techniques, for example, by the inclusion of an identifier within the received information which is suitable for comparison with an identifier included within the request which identifies which information is required. In some embodiments, this determination may additionally comprise determining whether the information satisfies a predetermined set of requirements, such as filtering rules 11A, 11B, 11C. The determination may additionally comprise confirming the veracity and integrity of the received information. In some embodiments, until such time that it is determined that all of the information has been acquired, the information receipt and concatenation processor 120 is configured to hold all of the information in a temporary local storage, such as local memory, a file or a database. This may be of particular relevance in an embodiment where the preliminary calculation processor 92 does not supply all of the required information at once, such as when the preliminary calculation processor 92 is provided with a queue and multiple pre-processing actions are required in order to fulfil a control parameter calculation request. In some embodiments, it may be possible for the calculation to begin without all required information having been provided, i.e. some aspects of the calculation can be performed immediately without the provision of all the required information. In these embodiments, the information receipt and concatenation processor 120 may be configured to determine when enough information has been supplied that a part of the calculation of the requested control parameter may begin. This process may be repeated for subsequent portions of the calculation until all information has been provided. This may be used where information is received and processed on the fly in order to increase the overall speed of processing.

The parameter calculation processor 94 is additionally provided with a parameter calculation engine 122 which is communicatively coupled to the information receipt and concatenation processor 120. The parameter calculation engine 122 is configured to receive the parameter calculation request in addition to all required information necessary to determine the value of the requested control parameter from the information receipt and concatenation processor 120. This receipt occurs when it is determined that the information receipt and concatenation processor 120 is in possession of all required information, in accordance with the above description. Alternatively, the receipt may occur when it is determined that there is sufficient information to perform a part of the calculation, in accordance with another embodiment. The parameter calculation engine 122 is then further configured to utilise this information to calculate the requested control parameter or to perform a part of the calculation of the control parameter. This is achieved by using the received information in combination with the provided calculation rules 11A, 11B, 11C, where the rules may be included with information retrieved from the one or more internal databases 12, 14, 16. The method through which the control parameter is calculated is described in greater detail below with reference to FIGS. 8A, 8B and 8C. The parameter calculation engine 122 is further configured to transmit the value of the calculated control parameter to the results processor in a suitable format, along with any additional metadata which allows the control parameter to be associated with the initial request.

Figure 6:
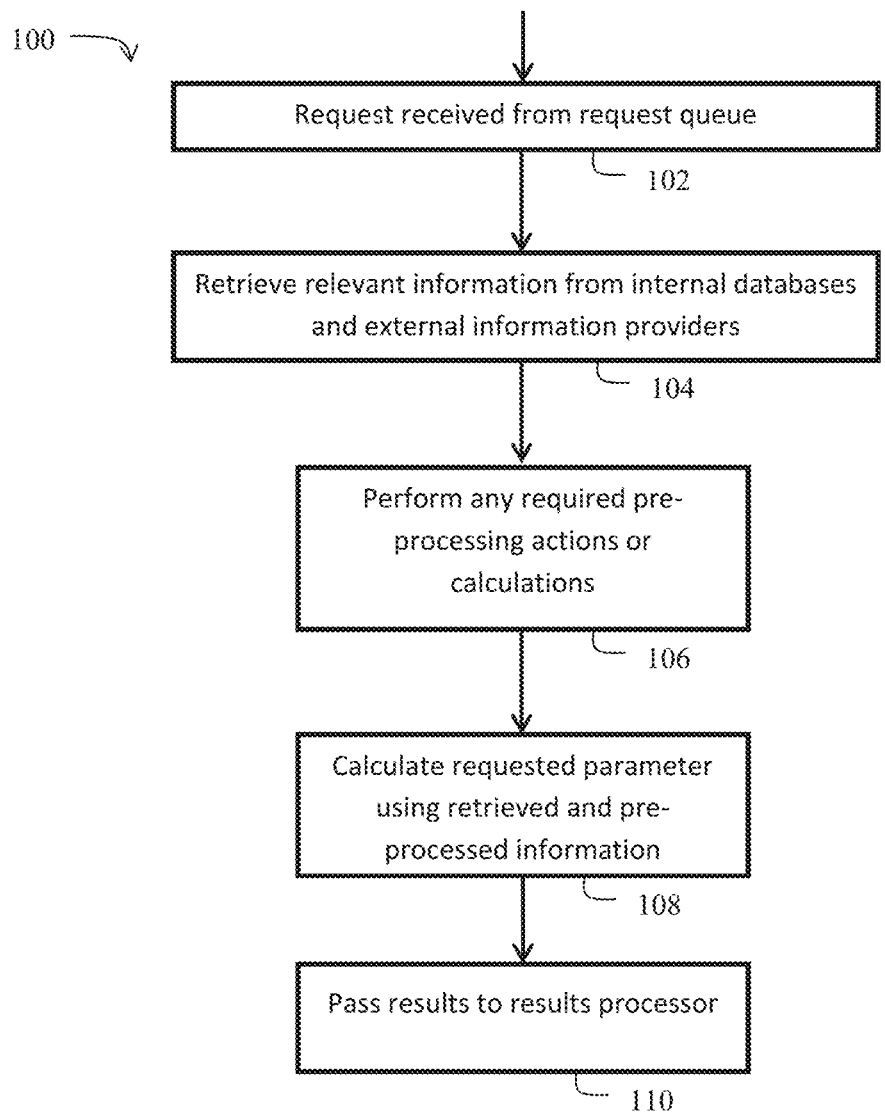
FIG. 6 is a flow diagram, showing a method of operation of the central control system of FIG. 2A or FIG. 2B.

The method of operation 130 of the parameter calculation processor 94 first referenced in Step 108 of FIG. 6 is now described in greater detail with reference to FIG. 8A. The method 130 begins when information is received, at Step 132, by the information receipt and concatenation processor 120 from the preliminary calculation processor 92. Upon receipt of this information, it is then determined, at Step 134, whether all of the information which is required to perform the control parameter calculation has been provided. This may be achieved in accordance with the description given previously. If it is determined that there is still some required information missing, the method 130 returns to step 132 where it awaits the receipt of more information from the preliminary calculation processor 92. In some embodiments, there may also be included a predetermined time period by which the information receipt and concatenation processor 120 must receive all of the required information. If the predetermined time period elapses without all required information being received, the processing of the request times out and the calculation terminates. Upon termination, the status of the request may be updated to reflect this, in accordance with any of the embodiments described above. If however it is determined that all of the required information has been supplied, then the parameter calculation processor 94 assesses, at Step 136, whether using the present value of the requested control parameter (RCP) will lead to an action which satisfies the SER set by the remote interaction unit 18A, 18B, 18C, 18D. If the present value of the control parameter does lead to an action which satisfies the SER set by the remote interaction unit then the present value of the control parameter is said to adhere to the SER. This assessment is achieved by the parameter calculation processor 94 utilising the retrieved calculation rules 11A, 11B, 11C to perform a calculation which assesses the outcome of an action using the current control parameter value, using as inputs to the calculation: the current control parameter value 238, the provided information regarding local CERs 240, 242, 244, any relevant external CERs and any available relevant historical information. The calculation will typically return a numerical value for an operating condition which the SER requires be a certain value or within a certain range of values. By way of illustration, and returning to the electric vehicle example as previously discussed, the SER may be that the vehicle must be operated in such a way that it travels between 30 and 50 kilometers, where the control parameter to be adjusted has a direct influence on how far the vehicle can travel (for example, the speed of the vehicle). The calculated value will then be compared to the SER to determine whether the value is in adherence with said constraint. In the case of the electric vehicle, the result of the calculation may be that the vehicle can only travel 25 kilometers using its current speed. In this case, the parameter calculation processor would determine that the current control parameter does not lead to an action which is in adherence with the SER. The degree to which the adherence is assessed may be arranged to be a binary decision (i.e. it adheres or does not adhere), or this may be arranged so that there are varying degrees of adherence, for example, there may be a classification of the degree of adherence. This will be discussed further below with reference to FIG. 8B.

Once the adherence has been assessed, at Step 136, the parameter calculation processor 94 then determines, at Step 138, whether the initial received value of the RCP in the request would lead to a corresponding action which sufficiently adheres to the SER. If it is determined that it does, the method 130 then passes the initial received value of the RCP and any associated information (such as the request identifier 232) to the results processor 96, where this information is then distributed in accordance with the description given above. If however it is determined, at Step 138, that the initial received value of the RCP leads to a corresponding action which does not sufficiently adhere to the SER, the method 130 then proceeds to calculate, at Step 139, a new value for the RCP using the results of any previous calculations and the initially supplied information. The way in which this is achieved is discussed in greater detail below with reference to FIG. 8C. The method 130 then passes the new value of the control parameter and any associated information (such as the request identifier 232) to the results processor 96 as described above (see Step 110 of FIG. 6). The parameter calculation processor 94 includes an instruction generating matrix (not shown). The function of this matrix is determined by a classification and categorisation system which considers the degree of adherence of the initial received value of the RCP to the SER, in consideration of the local CERs and the external CERs. This will be described in greater detail below with reference to Steps 154, 156 and 158.

Figure 8A:
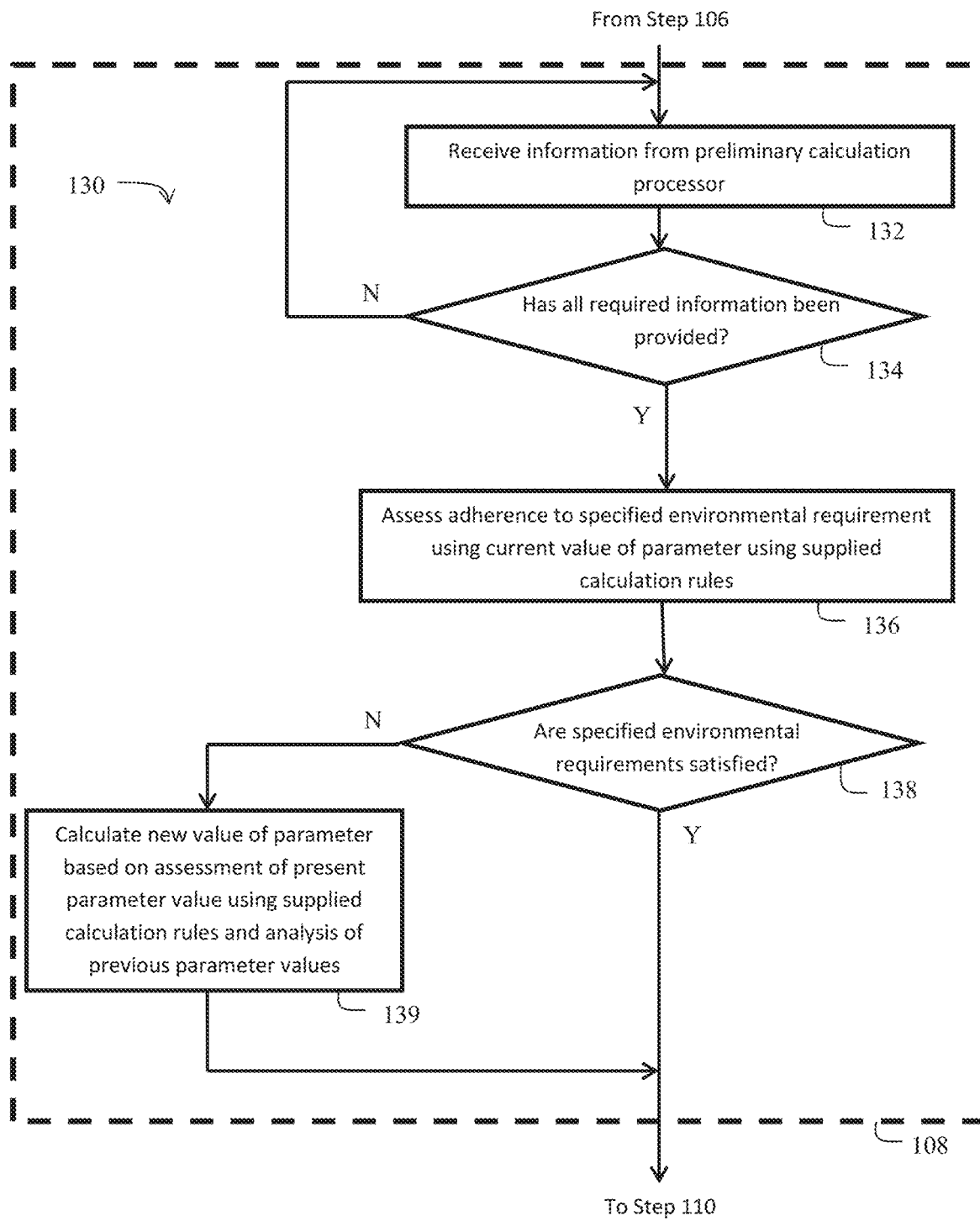
FIG. 8A is a flow diagram, showing a method of operation of the parameter calculation processor of FIG. 5.
Figure 8B:
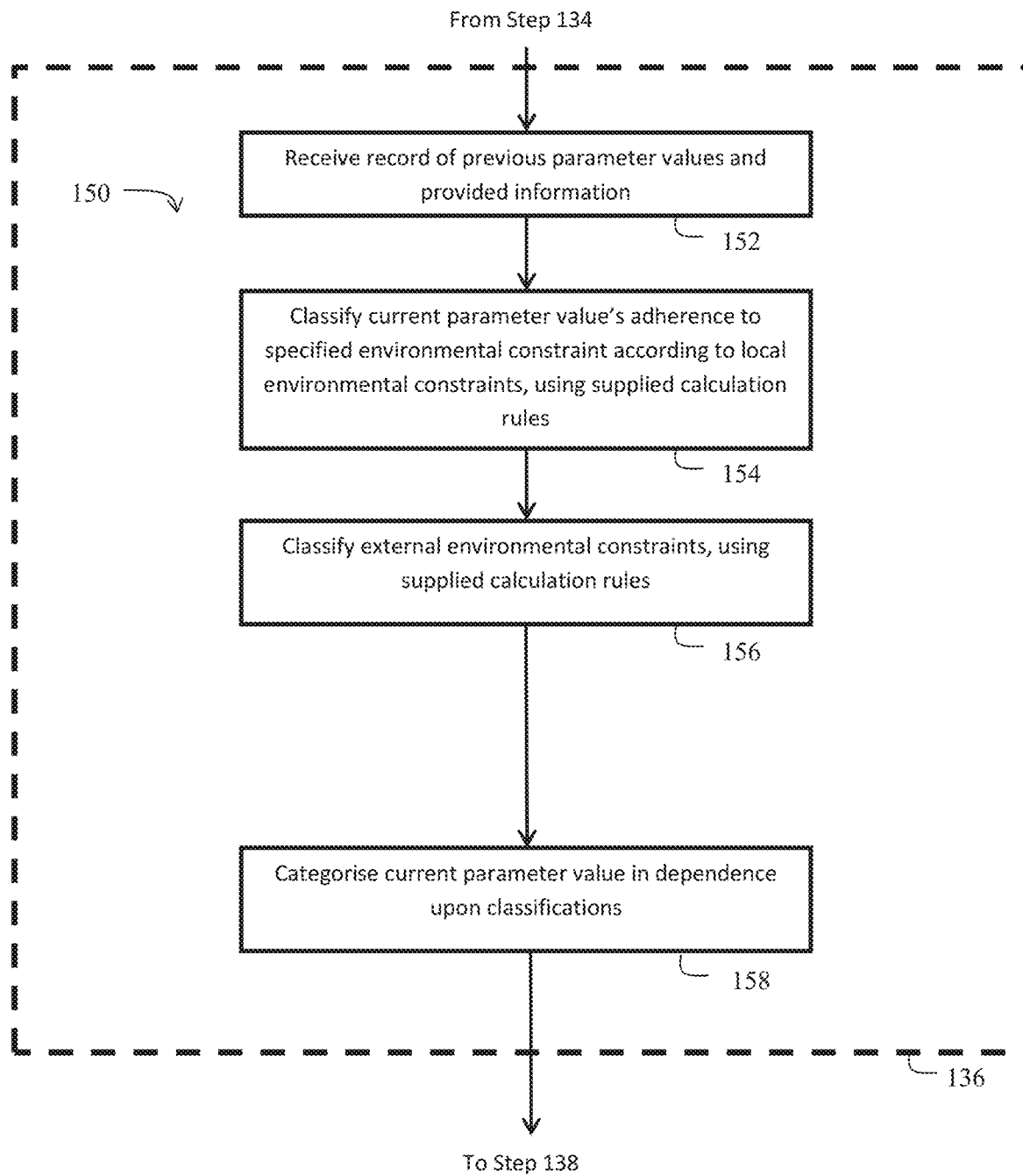
FIG. 8B is a flow diagram, showing a method of parameter value assessment in a possible embodiment of the method of FIG. 8A.

The method of operation 150 utilised in assessing whether using the present value of the RCP will lead to an action which satisfies the SER set by the remote interaction unit 18A, 18B, 18C, 18D first referenced in Step 136 of FIG. 8A is now described in greater with reference to FIG. 8B, for a particular embodiment. The method 150 begins when the information required to perform the calculation is received, at Step 152 by the parameter calculation processor 94. This information may include the current RCP value 238, the provided information regarding local CERs 240, 242, 244, values of any relevant external CERs and any available relevant historical information (such as previous CERs 212, 214, results of the categorisations and classifications and control parameter values) as described above. The parameter calculation processor 94 then classifies, at Step 154, the current control parameter value's adherence to the SER according to local CERs, using supplied calculation rules

11A, 11B, 11C. This classification will typically involve performing a calculation in accordance with the description above, with reference to FIG. 8A, however the calculation will be performed whilst only considering environmental constraints which are local to the remote interaction unit 18A, 18B, 18C, 18D. In embodiments where the remote interaction unit 18A, 18B, 18C, 18D requests a control parameter calculation for a second remote interaction unit, the local environmental constraints will be local to the remote interaction unit that the calculation is being made in respect of. Returning to the electric vehicle example, this may comprise factors such as the weight of the vehicle, the electric charge level of the vehicle and the tyre conditions of the vehicle. Once the calculation is performed, the value yielded by this calculation is compared to the SER and the result is classified as a result of this comparison, where the classification is determined by the supplied calculation rules 11A, 11B, 11C which can also be expressed in the form of the instruction generating matrix 201 (described later using examples). The classification may comprise two or more categories or classes which indicate the calculated value's adherence to the SER. In an embodiment, the classifications may be binary and simply indicate whether the calculated value adheres to the SER. In an alternate embodiment, the classifications may comprise further segregation to describe a more detailed relationship between the calculated value and the SER. By way of non-limiting example, the classification may indicate that the calculated value is 5-10% greater than the required value, or that it is 15-20% lower than the required value.

Once this classification has been performed, at Step 154, the method 150 then continues by classifying, at Step 156, the external CERs, using supplied calculation rules 11A, 11B, 11C. This will involve performing a classification which solely consider external CERs. These factors are typically provided by external information providers 24A, 24B, 24C and, returning to the electric vehicle example, these may comprise factors such as the weather, the present relevant traffic conditions, the speed of other vehicles and any relevant road closures. The external CERs may also comprise information received from other remote interaction units 18A, 18B, 18C, 18D, where information received from said units may be relevant to the present calculation.

Once this classification has been performed, at Step 156, the method 150 then continues by further categorising, at Step 158, the current control parameter value in dependence upon the classifications which were assigned at Steps 154 and 156. This may be achieved by using an IF, THEN logical construct, where if the classifications meet certain requirements, a particular categorisation is given. Alternatively, the method may also comprise a look-up matrix which uses the two given classifications as pivot points in order to search for the appropriate categorisation for the current control parameter value.

In an alternate embodiment, Steps 154, 156 and 158 are combined such that the classifications are not separated between local and external CERs but are instead performed simultaneously. In this way, the separate classifications are not performed, and instead a categorisation is performed following one calculation being enacted by the parameter calculation processor 94. This may be achieved by appropriately configuring the supplied calculation rules 11A, 11B, 11C such that the calculation considers both local and external CERs simultaneously.

In a yet further embodiment, Step 156 may be modified such that the external CER classification also takes into consideration one or more of the local CERs. In this scenario, the local CER classification is still performed without consideration of the external CERs. This may be achieved by appropriately configuring the supplied calculation rules 11A, 11B, 11C such that the calculation considers external CERs in conjunction with local CERs when performing this classification.

Once the categorisation has been assigned in accordance with an embodiment given above, it is then determined whether the initial suggested value of the control parameter would lead to a corresponding action which conforms to the SER, as described in Step 138 of FIG. 8A.

Figure 8C:
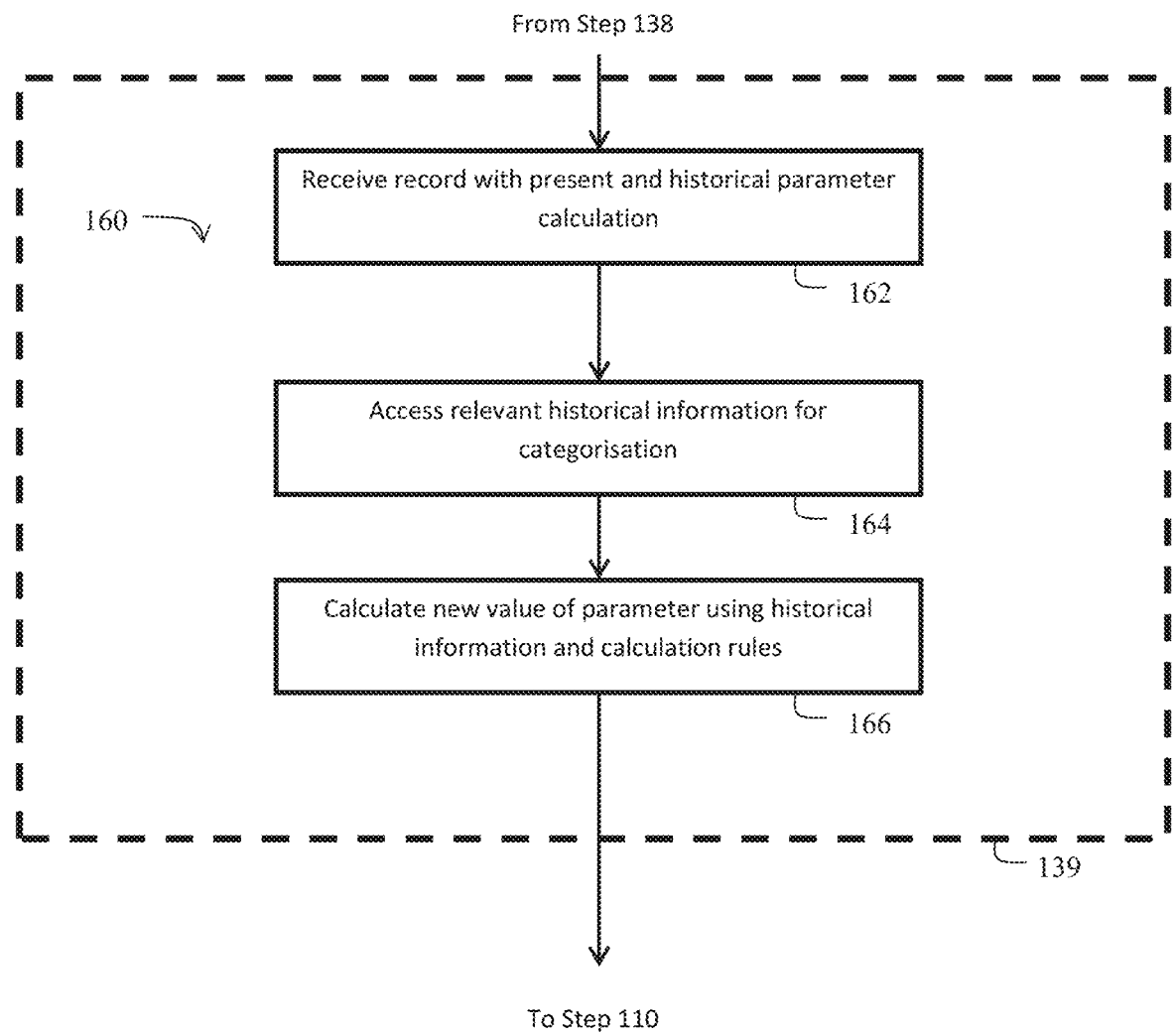
FIG. 8C is a flow diagram, showing a method of parameter calculation in a possible embodiment of the method of FIG. 8A.

The method of operation 160 utilised in calculating a new value of a control parameter first referenced in Step 139 of FIG. 8A is now described in greater detail with reference to FIG. 8C. The method 160 begins when a record is received, at Step 162, containing information regarding the current control parameter value, previously calculated control parameter values, the categorisation assigned to the record at Step 158 of method 150, calculation rules 11A, 11B, 11C and other provided information, such as local and external CERs. The parameter calculation processor 94 then accesses, at Step 164, the relevant historical information for the categorisation assigned to the present control parameter request. In order to calculate an appropriate new value for the requested control parameter, it is advantageous to consider previous calculations which have been performed for calculations which have the same categorisation as the present request. The historical results may provide an indication of the likely future outcomes of using a particular control parameter value in the present request. In this way it is advantageous to filter information which is not relevant to the present calculation and selectively including only information which has the same categorisation provides a suitable of method of achieving such a filter. Where appropriate, the parameter calculation processor 94 may also consider information which relates to other categorisations, if these provide relevant information relating to the current request. This may be advantageous when the consideration of information relating to other categorisations allows an improved calculation of the requested control parameter, for example enabling a more accurate statistical analysis.

Once the relevant information has been accessed, at Step 164, the method 160 then proceeds to calculate, at Step 166, a new value for the control parameter using this accessed information and the supplied calculation rules 11A, 11B, 11C. This may comprise the parameter calculation rules adjusting the present control parameter value in accordance with a particular rule associated with the present categorisation, for example, by increasing or decreasing the value of the present value by a particular percentage or by increasing or decreasing the value by an absolute amount. This may also comprise the parameter calculation processor 94 performing a data analysis technique on the historical information to determine an appropriate adjustment to make to the present value of the control parameter, where the data analysis technique is specified by the supplied calculation rules 11A, 11B, 11C. The data analysis technique may comprise a linear regression method such as a least squares estimation or a Bayesian linear regression technique, or other statistical inference methods such as Bayesian inference. The data analysis technique may also comprise the training and usage of a neural network, which uses the provided historical information for training a statistical model, and where said model is then used to predict the adjusted value of the control parameter and the outcome of the control parameter adjustment. It is to be understood that the above techniques are provided as examples at that any technique may be used which enables an estimation of the control parameter adjustment to be calculated. The data analysis technique forms a relationship between the combination of the control parameter to be calculated and the local and external CERs, and the SER provided by the remote interaction unit 18A, 18B, 18C, 18D. In this way, the parameter calculation processor 94 is better able to predict the outcome of the action resulting from a change in the control parameter value, and thereby suggest an appropriate control parameter value to achieve the aim of meeting the SER.

Once a new value for the control parameter has been calculated, the method 160 then passes the new value of the control parameter and any associated information (such as the request identifier 232) to the results processor 96 as described above to generate the control signal.

The central control system 10 according to the embodiments described above may further comprise a logging system (not shown). The logging system may be configured to store information in relation to the requests sent to the central control system 10, together with the status of their processing. Additionally, the logging system may record any abnormal state or error encountered during the operation of the central control system 10. The logs themselves may be stored in one or more the local databases 12, 14, 16.

An example of how the central control system 10 may be arranged in use is described below with reference to the central control system 10 providing control signals to one or more electric vehicles. It is to be understood that this is one example of a possible use and that other uses are envisaged for this system.

For the purpose of this example, the electric vehicle is required to travel to a particular destination and arrive at that destination with a particular electrical charge level, and this is to be achieved by varying the speed of the vehicle along the journey. In this scenario, the distance to the particular destination may be thought of as the SER and the charge level that the vehicle arrives at that destination with may be thought of as a local CER. Furthermore in this scenario, the car cannot be recharged along the journey as there are no recharging stations along the route. The reasons that it may be advantageous to arrive with a certain electric charge level at the destination may include a user planning for a future journey and requiring sufficient charge to make that journey as well, or that it is planned that the vehicle will recharge once it reaches its destination but there is a limited amount of time that the vehicle can charge at this destination.

In order to achieve this, a request is sent by an interaction unit located in the vehicle which is configured to communicate with a central control system which calculates an appropriate speed to travel at in order to achieve this aim. A request is sent from the interaction unit indicating the SER (travelling between 30 and 50 kilometers), the control parameter to be calculated (speed of the vehicle), the current value of the control parameter and local CERs of the vehicle (current charge level, weight of the vehicle, condition of the tyres, electrical consumption of other systems in the vehicle, route to the destination). The request also indicates that it will require information relating to traffic conditions along the route, any road closures along the route and weather conditions along the route. The request will also provide an indicator of the source of the request and also a unique request identifier. Once the request has been sent, the interaction unit is then configured to power down in order to conserve energy. The interaction unit is configured to then periodically power up and query the state of the request by transmitting a query to the central control system 10.

Upon receipt of this request, the central control system processes the request and places it in a request queue. Upon the request entering the queue, the notification system is updated to indicate that it is awaiting processing. Once the request reaches the top of the queue, it then passes to the information collection processor where the required information is requested from internal and external sources. External sources may comprise weather information services, traffic reports, information which may be available from other vehicles (such as the speed of the vehicles) and global positioning system (GPS) navigation information. Once the request undergoes processing, the notification processor is updated to indicate the change in state of the request (i.e. that it is being processed). The information collection processor also retrieves appropriate calculation rules 11A, 11B, 11C from internal databases 12, 14, 16 and previous calculations relating to the speed of this vehicle and other similar vehicles and the results of these calculations. Following this, the retrieved information and request are then passed to the preliminary calculation processor where the raw retrieved information undergoes any necessary calculations such that the information may be used in control parameter calculations. This may include combining the GPS navigation information with the notifications of traffic conditions to determine which areas along the route may have particular speed restrictions which may affect electric charge consumption of the vehicle due to vehicle idling. The preliminary calculation processor (classification engine) 92 also creates a classification matrix 191 (see FIG. 9) using the information that has initially been retrieved from the external sources as described above.

Upon all of the necessary calculations being performed, all of the processed information is then passed to the parameter calculation processor 94. A calculation is then performed to determine the distance the vehicle can travel (the SER) at its current speed (the requested control parameter 238) and considering local CERs 242, 244 (such as initial charge level). This calculation is numerical in nature. Following this calculation, the difference between the desired and actual distances the car can travel is determined and the result is classified in accordance with this. For example, if the car needs to travel 30 kilometers (requested (specified) value of parameter for SER) but can only travel 24 kilometers (current value of SER), the calculation may classify the current control parameter as "insufficient" Following this, a similar calculation and classification is performed but considering external environmental constraints where the environmental constraints are provided in a largely qualitative format, for example, the weather conditions being deemed as 'snowing' or 'sunny.' An example of how this information may be used to determine a classification for the external CERs is illustrated in FIG. 9. In this figure, a plurality of external CERs 190A, 190B, 190C are each assessed in the classification matrix 191 in three scenarios 193, and in each scenario a qualitative description (e.g. no road closures, no known traffic jams) for each of the external CERs 190A, 190B, 190C is returned, where this information has initially been retrieved from external sources as described above and the classification matrix 191 has been created by the preliminary calculation processor (classification engine) 92. These qualitative descriptions are then assessed in combination to lead to an external classification 192 in each of the scenarios 193. In another embodiment the external classification 192 can be determined using the matrix 191 within the preliminary calculation processor (classification engine) 92 prior to operation of the parameter calculation processor 94. One way that such a classification may be achieved is that each qualitative description may be assigned a particular score, where the summation or other combination of these scores is used to assign a total score to this scenario, and the total score is used to assign an overall classification to the scenario in accordance with the provided calculation rules. This is an example of a potential numerification of the qualitative information. However any suitable method which allows classification of qualitative information may be used.

The two classifications are then used by the parameter calculation processor 94 to determine a categorisation for the present value of the requested control parameter 238 as described above, in order to calculate a new value for the control parameter so that the vehicle is able to reach its desired destination with a particular fuel level. An example of how the classifications may be used to categorise the present value of the requested control parameter is illustrated in FIG. 10. In this figure, a reference table (or instruction generation matrix) 201 is shown which lists five categories of local CER classifications 200A, 200B, 200C, 200D, 200E for the current value of the speed (namely ≥15% under target distance 200A, <15% and >5% under target distance 200B, within 5% of the target distance 200C, <15% and >5% over target distance 200D, and ≥15% over target distance 200E) and three categories of external CER classifications 202A, 202B, 202C, where these classifications are discussed above with reference to FIG. 9. For each combination of classifications (where this combination is known as a categorisation), a particular course of action is suggested in the form of an instruction. This suggested action may be predetermined or may be arrived at through a data analysis technique as discussed previously. Such a suggested action (instruction) is illustrated with reference to FIG. 10, where if it is determined that the local CER classification at the current speed leads to travelling to within 5% of the target distance, and the external CER classification is determined to be 'bad' for example, the suggested course of action (instruction) is to reduce speed by 5%. The actions which are suggested are illustrative and may vary as a result of additional factors, such as the present speed of the vehicle (i.e. if the vehicle is travelling at a high speed, the suggested action and categorisation may be different to the one which is suggested for when the vehicle is travelling at a low speed). Furthermore, these suggested actions (instructions) may also vary as a function of time as more historic data is made available and a more accurate action may be suggested. Upon the local and external CER classifications being determined, the parameter calculation processor 94 will look up the suggested action (instruction) for that categorisation and use this to calculate what the new value of the requested control parameter should be.

Upon calculation of this control parameter, the results are then passed to the results processor 96 to be stored in an internal database 38 of the central control system 10 and to update the request queue and notification system that the request has been processed and is ready to be retrieved by the interaction unit of the vehicle.

Figure 11:
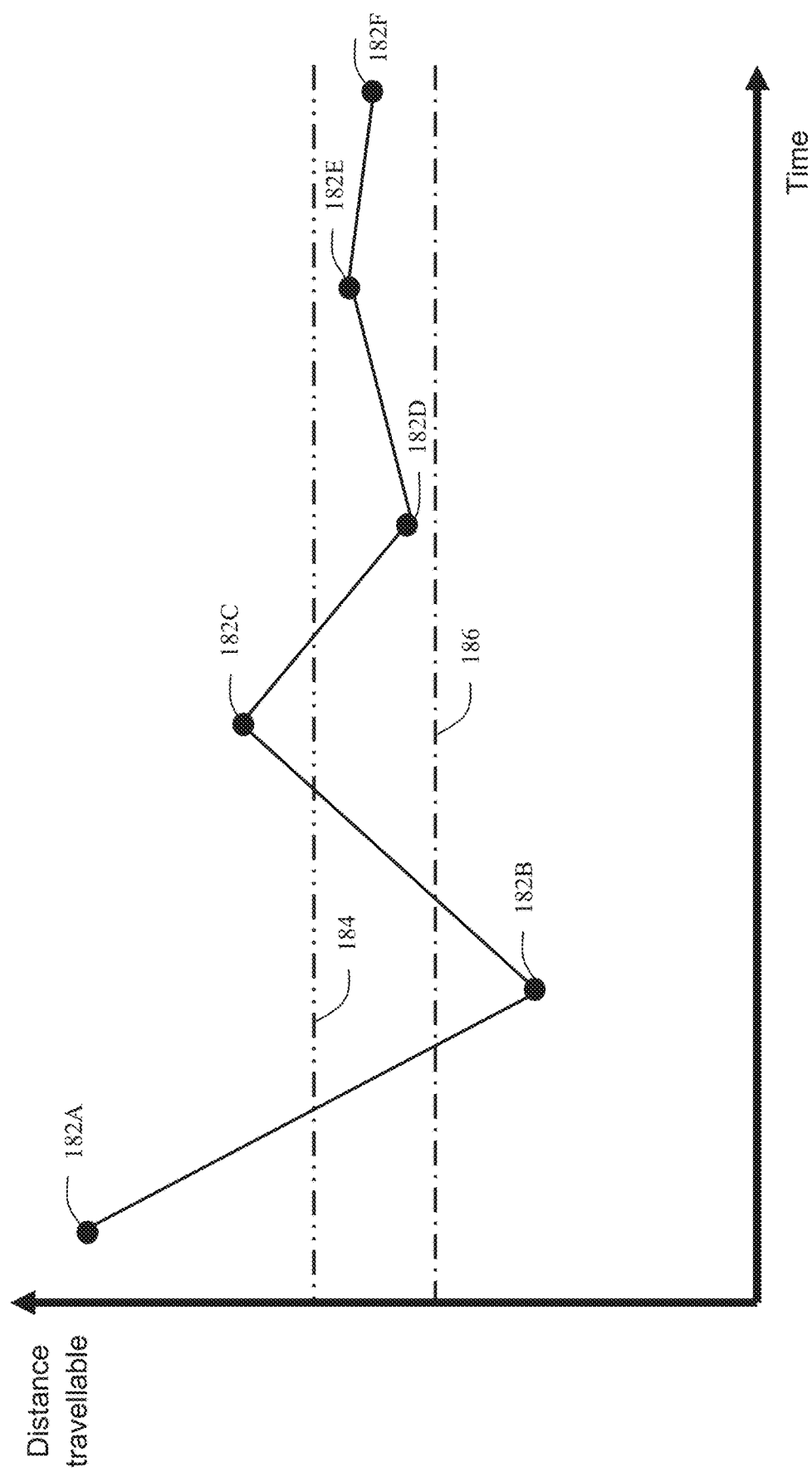
FIG. 11 is a graphical illustration, showing the evolution over time of the outcomes of suggested parameter values in a use scenario of the central control system of FIG. 2A or FIG. 2B.

The vehicle is configured to periodically make these requests such that the vehicle is able to adjust its speed in accordance with any changes in environmental requirements which may occur. Over time, as more information is made available to the central control system 10, the results of the calculation may be more accurate in achieving the aim of the request. With reference to FIG. 11, the possible progression over time of successive parameter requests 182A, 182B, 182C, 182D, 182E, 182F is illustrated. At 182A, the initial value of the requested control parameter is input to the central control system 10 and the distance that the vehicle will travel is calculated as being greater than a maximum given value 184. As a result the central control system 10 calculates a new value for the control parameter to attempt to correct this. At a later time 182B, the vehicle sends another request using the previously calculated control parameter value as its initial value. It is now determined that the distance that the vehicle will travel is calculated as being less than a minimum given value 186. The reason that the previously calculated control parameter value may be wrong may be that the central control system 10 did not have sufficient information to make an accurate suggestion. Alternatively, the environmental constraints may have changed in between requests (e.g. a traffic jam may have developed along the route). As a result the central control system 10 once more calculates a new value for the control parameter to attempt to correct this. Over time and successive attempts, the central control system 10 will assimilate more information in order to suggest control parameter values which will lead to a distance traveled being within the required minimum 186 and maximum limits 184. It may also be the case that the minimum and maximum limits relating to the distance to be traveled may be altered between successive parameter requests. In this case, the knowledge assimilated by the central control system 10 up to this point will be used in order to provide a suggested control parameter value which acknowledges this alteration.

It is to be understood that the above example is just one area of application in which the present invention may be utilised. Other areas of application may include distributed resource management systems which require that resource levels at different geographic locations are maintained at an optimal level to accommodate consumption of those resources and the operation of other systems connected to the resource management system are dependent on this level of resource being maintained. Another embodiment to which the above described control system invention can be applied is in the determination of a price factor in different retail outlets where the price has to take into consideration local and external factors in order to be accurate. For example the price factor can be determined on internal factors such as the amount of available local stock as well as external factors such as competitor pricing, time of year, and relative geographic location of a retail outlet. Regardless of the application in which such systems are employed, the systems all must take into account a plurality of external and internal factors which affect how a system must be operated in order to maintain overall efficient operation. Furthermore, it will be understood that features, advantages and functionality of the different embodiments described herein may be combined where context allows.

Having described several example embodiments of the present invention and the implementation of different functions of the device in detail, it is to be appreciated that the skilled addressee will readily be able to adapt the basic configuration of the system to carry out described functionality without requiring detailed explanation of how this would be achieved. Therefore, in the present specification several functions of the system have been described in different places without an explanation of the required detailed implementation as this not necessary given the abilities of the skilled addressee to code functionality into the system. Additionally, it is to be understood that features, functions and advantages of different aspects of the present invention may be combined or substituted where context allows.

What is claimed is:

1. A computer-implemented distributed resource management control system for generating control signals for controlling one or more remotely-located interaction units via a wide-area communications network, wherein the remotely-located interaction unit is configured to control one or more connected systems at a corresponding remote location which utilise the distributed resource, the control system comprising:
   a request interface processor configured to receive a request for a control signal of a requested control parameter (RCP) relating to a specified environmental requirement (SER) from one of the one or more remotely-located interaction units, where the RCP is a parameter which determines the amount of distributed resource used by the one or more connected systems at the corresponding remote location, and the SER is an environmental parameter of at least one of the one or more connected systems whose value is determined by the RCP; the request including: a current value of the RCP, a specified value of the SER to be met; and current values of one or more local constraining environmental parameters (local CERs) related to the SER; which restrict the values of the RCP which can be taken to achieve the specified value of the SER to be met; wherein a current value of the SER can be calculated from the current values of the RCP and the one or more local CERs of the one or more remotely-located interaction units;
   a parameter calculation system configured to process the request received at the request interface processor in accordance with predefined rules and to generate the control signal concerning the requested control parameter (RCP); and
   a transmitter for transmitting the generated control signal to a requesting remotely-located interaction unit,
   wherein the parameter calculation system comprises:
      a classification engine for classifying a plurality of current external constraining environmental parameters (external CERs) associated with the remotely-located interaction unit into a single external CER parameter, where the value of the single external CER parameter restricts the values of the RCP which can be taken to achieve the specified value of the SER to be met; and
      a parameter calculation processor configured to:
      calculate the current value of the SER by applying the rules to the current value of the RCP and the current values of the one or more local CERs of the one or more remotely-located interaction units;
      categorise the current value of the SER with the value of the single external CER parameter to determine the effect of the plurality of current external CERs on the current value of the SER;
      compare the categorised current value of the SER with the specified value of the SER and depending on classification of a degree of difference between the current and specified values of the SER, to select a corresponding predetermined action to adjust the value of the RCP to make the current value of the SER and the specified value of the SER equivalent; and
      use the selected predetermined action to form the control signal to adjust the current value of the RCP for the requesting remotely-located interaction unit to meet the specified value of the SER.

2. A computer-implemented distributed resource management control system of claim 1, wherein the parameter calculation system further comprises an information collection processor arranged to request and obtain the values of any external CERs for use by the parameter calculation processor in calculating the current value of the SER.

3. A computer-implemented distributed resource management control system of claim 2, wherein the information collection processor is arranged to determine at least some of the required external CERs from the one or more parameters specified in the request.

4. A computer-implemented distributed resource management control system of claim 2, wherein the request comprises a local CER including a location of the remotely-located interaction unit; and the information collection processor is arranged to use the location of the remotely-located interaction unit to determine which external CERs are to be used for generation of the classified single external CER parameter.

5. A computer-implemented distributed resource management control system of claim 2, wherein the information collection processor is arranged to collect information pertaining to the request from internal databases and external data sources and calculate parameter values from the received information or aggregate the received information for further processing.

6. A computer-implemented distributed resource management control system of claim 2, wherein the parameter calculation system further comprises a results processor which is arranged to receive the control signal from the parameter calculation processor and store the local and external CERs, the result of the categorisation and classification, and the control signal to a parameter results store for provision to the remote interaction unit and for use as historical parameter data.

7. A computer-implemented distributed resource management control system of claim 6, wherein the request interface processor is arranged to receive a request which includes: one or more historical information parameters, and the information collection processor is arranged to retrieve values for the historical information parameters from the historical parameter data stored in the local data store.

8. A computer-implemented distributed resource management control system of claim 1, wherein the classification engine comprises a classification generating matrix arranged to combine together a plurality of different external CERs in different combinations to arrive at a single overall external CER classification describing the external CERs.

9. A computer implemented distributed resource management control system of claim 8, wherein the classification engine is arranged to classify the plurality of external CERs in a plurality of scenarios with qualitative descriptions, each qualitative description having assigned thereto a particular score which can be used to manipulate the qualitative description as a quantitative classification.

10. A computer-implemented distributed resource management control system of claim 8, wherein the parameter calculation processor comprises an instruction generating matrix arranged to provide the corresponding predetermined action as one of a plurality of predetermined instructions provided in the matrix, the matrix being indexed by the current SER value based on the current values of the one or more local environmental parameters (local CERs) at the current value of the RCP; and the single external overall CER classification.

11. A computer-implemented distributed resource management control system of claim 1, further comprising a notification system for notifying the status of the received request, the notification system being arranged to at least send a notification to the requesting remote interaction unit, when the request has been processed and the control signal is ready to be transmitted on-demand to the requesting remote interaction unit and wherein the transmitter is arranged to transmit the control signal to the requesting remote interaction unit on receipt of a pull instruction from the requesting remote interaction unit.

12. A computer-implemented distributed resource management control system of claim 11, further comprising a request queue for storing the request until the parameter calculation system is able to process the request to generate the control signal, wherein the notification system is coupled to the request queue and the notification system is arranged to determine a real-time record of the status of the request indicating whether the request is waiting to be processed, is being processed or has been processed and to provide a status of the request to the requesting remote interaction unit on demand.

13. A computer-implemented distributed resource management control system of claim 12, wherein the request interface processor is arranged to assign a unique identifier to each received request, and the notification system is arranged to use the identifier to determine the real-time status of the request.

14. A computer-implemented distributed resource management control system of claim 1, wherein the request interface processor is arranged to verify the veracity and integrity of the request and to notify the requesting remote interaction unit if a request cannot be processed.

15. A computer-implemented distributed resource management control system of claim 1, wherein the request interface processor is arranged to receive a proxy request relating to one or more different remotely-located interaction units; and the parameter calculation system is arranged to generate a control signal for controlling the one or more different remotely-located interaction units rather than the requesting remotely-located interaction unit.

16. A computer-implemented distributed resource management control system of claim 1, wherein the specified value of the SER is a predetermined value stored in the control system and the received request comprises a trigger identifier indicating to the parameter calculation processor that the predetermined stored value of the SER should be as the specified SER in its comparison.

17. A computer-implemented distributed resource management control system of claim 1, wherein the request interface processor is arranged to receive a request relating to a plurality of remotely-located interaction units; to divide the request into a plurality of sub-requests each relating to a subset of the one or more remotely-located interaction units and the parameter calculation system is arranged to process each of the plurality of sub-requests and generate a control signal for each of the sub-requests for controlling the respective one of the remotely-located interaction units.

18. A computer-implemented method of operating a distributed resource management control system for generating control signals for controlling one or more remotely-located interaction units via a wide-area communications network, wherein the remotely-located interaction unit is configured to control one or more connected systems at a corresponding remote location which utilise the distributed resource, the method comprising:

receiving a request for a control signal of a requested control parameter (RCP) relating to a specified environmental requirement (SER) from one of a plurality of remotely-located interaction units, where the RCP is a parameter which determines the amount of distributed resource used by the one or more connected systems at the corresponding remote location, and the SER is an environmental parameter of at least one of the one or more connected systems whose value is determined by the RCP; the request including: a current value of the RCP, a specified value of the SER to be met; and current values of one or more local constraining environmental parameters (local CERs) related to the SER which restrict the values of the RCP which can be taken to achieve the specified value of the SER to be met; wherein a current value of the SER can be calculated from the current values of the RCP and the one or more local CERs;

processing the request received at the request interface processor in accordance with predefined rules and to generate the control signal concerning the requested control parameter (RCP); and transmitting the generated control signal to a requesting remotely-located interaction unit, wherein the processing step comprises:

classifying a plurality of current external constraining environmental parameters (external CERs) associated with the remotely-located interaction unit into a single external CER parameter, where the value of the single external CER parameter restricts the values of the RCP which can be taken to achieve the specified value of the SER to be met;

calculating the current value of the SER by applying the rules to the current value of the RCP and the current values of the one or more local CERs;

categorising the current value of the SER with the value of the single external CER parameter to determine the effect of the plurality of current external CERs on the current value of the SER;

comparing the categorised current value of the SER with the specified value of the (SER) and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

19. A non-transitory computer-readable medium having instructions comprising a software program stored thereon, wherein the instructions are configured to be executed on a processor of a computer-implemented distributed resource management control system, and the instructions, upon execution by the processor, enable the computer-implemented distributed resource management control system to generate control signals for controlling one or more remotely-located interaction units via a wide-area communications network, wherein the remotely-located interaction unit is configured to control one or more connected systems at a corresponding remote location which utilise the distributed resource, the instructions causing the computer-implemented distributed resource management control system to:

receive a request for a control signal of a requested control parameter (RCP) relating to a specified environmental requirement (SER) from one of a plurality of remotely-located interaction units, where the RCP is a parameter which determines the amount of distributed resource used by the one or more connected systems at the corresponding remote location, and the SER is an environmental parameter of at least one of the one or more connected systems whose value is determined by the RCP; the request including: a current value of the RCP, a specified value of the SER to be met; and current values of one or more local constraining environmental parameters (local CERs) related to the SER which restrict the values of the RCP which can be taken to achieve the specified value of the SER to be met; wherein a current value of the SER can be calculated from the current values of the RCP and the one or more local CERs;

process the request received at the request interface processor in accordance with predefined rules and to generate the control signal concerning the requested control parameter (RCP); and transmit the generated control signal to a requesting remotely-located interaction unit, wherein the process step comprises:

classifying a plurality of current external constraining environmental parameters (external CERs) associated with the remotely-located interaction unit into a single external CER parameter, where the value of the single external CER parameter restricts the values of the RCP which can be taken to achieve the specified value of the SER to be met;

calculating the current value of the SER by applying the rules to the current value of the RCP and the current values of the one or more local CERs;

categorising the current value of the SER with the value of the single external CER parameter to determine the effect of the plurality of current external CERs on the current value of the SER;

comparing the categorised current value of the SER with the specified value of the (SER) and depending on classification of a degree of difference between the current and specified values of the SER, to select a corresponding predetermined action to adjust the value of the RCP to make the current value of the SER and the specified value of the SER equivalent; and using the selected predetermined action to form the control signal to adjust the current value of the RCP for the requesting remotely-located interaction unit to meet the specified value of the SER.

20. A computer-implemented distributed resource management control system for generating control signals for controlling one or more remotely-located interaction units via a wide-area communications network, wherein the remotely-located interaction unit is configured to control one or more connected systems at a corresponding remote location which utilise the distributed resource, the control system comprising:

a request interface processor configured to receive a request for a control signal of a requested control parameter (RCP) relating to a specified environmental requirement (SER) from one of the one or more remotely-located interaction units, where the RCP is a parameter which determines the amount of distributed resource used by the one or more connected systems at the corresponding remote location, and the SER is an environmental parameter of at least one of the one or more connected systems whose value is determined by the RCP; the request including: a current value of the RCP, a specified value of the SER to be met; and current values of one or more local constraining environmental parameters (local CERs) related to the SER, which restrict the values of the RCP which can be taken to achieve the specified value of the SER to be met; wherein a current value of the SER can be calculated from the current values of the RCP and the one or more local CERs of the one or more remotely-located interaction units;

a parameter calculation system configured to process the request received at the request interface processor in accordance with predefined rules and to generate the control signal concerning the requested control parameter (RCP); and a transmitter for transmitting the generated control signal to a requesting remotely-located interaction unit, wherein the parameter calculation system comprises:

a classification engine for classifying a plurality of current external constraining environmental parameters (external CERs) associated with the remotely-located interaction unit into a single external CER parameter, where the value of the single external CER parameter restricts the values of the RCP which can be taken to achieve the specified value of the SER to be met; and a parameter calculation processor configured to:

calculate the current value of the SER by applying the rules to the current value of the RCP and the current values of the one or more local CERs of the one or more remotely-located interaction units;

categorise the current value of the SER with the value of the single external CER parameter to determine the effect of the plurality of current external CERs on the current value of the SER;

compare the categorised current value of the SER with the specified value of the SER and depending on classification of a degree of difference between the current and specified values of the SER, to select a corresponding predetermined action to adjust the value of the RCP to make the current value of the SER and the specified value of the SER equivalent; and use the selected predetermined action to form the control signal to adjust the current value of the RCP for the requesting remotely-located interaction unit to meet the specified value of the SER;

wherein the classification engine comprises a classification generating matrix arranged to combine together a plurality of different external CERs in different combinations to arrive at a single overall external CER describing the external CERs.

* * * * *